United States Patent
Zhu et al.

(10) Patent No.: US 11,738,653 B2
(45) Date of Patent: Aug. 29, 2023

(54) INTEGRATED CHARGER AND MOTOR CONTROL SYSTEM ISOLATED BY MOTOR

(71) Applicant: Huawei Digital Power Technologies Co., Ltd., Shenzhen (CN)

(72) Inventors: Huibin Zhu, Plano, TX (US); Heping Dai, Plano, TX (US); Yongtao Liang, Shenzhen (CN); Weiping Liu, Shenzhen (CN); Feng Su, Shenzhen (CN); Shaohua Wang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 186 days.

(21) Appl. No.: 16/911,353

(22) Filed: Jun. 24, 2020

(65) Prior Publication Data

US 2021/0155103 A1    May 27, 2021

Related U.S. Application Data

(63) Continuation of application No. PCT/US2019/062852, filed on Nov. 22, 2019.

(51) Int. Cl.
*B60L 53/24* (2019.01)
*B60L 53/22* (2019.01)
(Continued)

(52) U.S. Cl.
CPC ............... *B60L 53/24* (2019.02); *B60L 53/22* (2019.02); *H02J 7/02* (2013.01);
(Continued)

(58) Field of Classification Search
CPC .................................... H02J 7/02; H02P 27/06
(Continued)

(56) References Cited

U.S. PATENT DOCUMENTS 6,495,985 B1 * 12/2002 Mayes ..................... H02P 4/00
                                                            318/400.06
7,154,237 B2   12/2006 Welchko et al.
(Continued)

FOREIGN PATENT DOCUMENTS

CN        107017816     *  8/2017  .............. H02P 25/18
EP        2908420 A1      8/2015
(Continued)

OTHER PUBLICATIONS

Lacroix, S., et al., "An Integrated Fast Battery Charger for Electric Vehicle," 2010 IEEE Vehicle Power and Propulsion Conference, Sep. 1-3, 2010, Abstract only, 2 pages.
(Continued)

*Primary Examiner* — Kawing Chan
*Assistant Examiner* — Zemenay T Truneh
(74) *Attorney, Agent, or Firm* — Vierra Magen Marcus LLP

(57) ABSTRACT

According to one aspect of the present disclosure, there is provided an apparatus that includes a battery, a Direct Current (DC) bus connected to the battery, and a DC to DC converter connected to the battery in parallel with the DC bus. A Motor Control Unit (MCU) is connected between the DC to DC converter and an electric motor. An Alternating Current (AC) port is connected to the electric motor. Switches connect the DC bus and an output of the DC to DC converter in series as an input to the MCU in a drive mode and disconnect the DC bus from the MCU in a charge mode.

17 Claims, 17 Drawing Sheets

(51) Int. Cl.
*H02J 7/02* (2016.01)
*H02M 3/335* (2006.01)
*H02P 27/06* (2006.01)
*H02M 1/00* (2006.01)
*H02M 7/5387* (2007.01)

(52) U.S. Cl.
CPC ... *H02M 3/33507* (2013.01); *H02M 7/53875* (2013.01); *H02P 27/06* (2013.01); *B60L 2210/10* (2013.01); *B60L 2210/40* (2013.01); *H02M 1/007* (2021.05)

(58) Field of Classification Search
USPC .......................................... 318/139, 400.06
See application file for complete search history.

(56) References Cited

U.S. PATENT DOCUMENTS

| | | | |
|---|---|---|---|
| 7,199,535 | B2 | 4/2007 | Welchko et al. |
| 7,847,437 | B2 | 12/2010 | Chakrabarti et al. |
| 8,013,553 | B2 | 9/2011 | Taniguchi |
| 8,030,884 | B2 | 10/2011 | King et al. |
| 8,288,887 | B2 | 10/2012 | Ransom et al. |
| 8,299,748 | B2 | 10/2012 | Soma et al. |
| 8,350,523 | B2 | 1/2013 | Kajouke et al. |
| 8,410,635 | B2 | 4/2013 | Ransom |
| 8,421,271 | B2 | 4/2013 | King et al. |
| 8,466,658 | B2 | 6/2013 | Kajouke |
| 9,120,390 | B2 | 9/2015 | King et al. |
| 9,227,518 | B2 * | 1/2016 | Fukushige ............ B60L 53/22 |
| 9,290,097 | B2 | 3/2016 | Steigerwald et al. |
| 9,973,110 | B2 | 5/2018 | Sadki et al. |
| 2020/0298722 | A1 * | 9/2020 | Smolenaers ............ H02J 7/345 |

FOREIGN PATENT DOCUMENTS

| | | | | |
|---|---|---|---|---|
| FR | 3018244 | B1 | 9/2015 | |
| FR | 3026243 | B1 | 3/2016 | |
| FR | 3059276 | * | 11/2016 | ............ B60L 11/18 |
| FR | 3059276 | A1 | 6/2018 | |
| WO | 2020242444 | A1 | 12/2020 | |

OTHER PUBLICATIONS

Liu, Bochen, et al., "The Dual-Channel Magnetically Integrated Chargers for Plug-in Electric Vehicles," ECCE 2016, Sep. 2016, Abstract only, 2 pages.

Su, Gui-Jia, et al., "An Integrated Onboard Charger and Accessory Power Converter for Plug-in Electric Vehicles," ECCE 2013, Sep. 2013, Abstract only, 2 pages.

Su, Gui-Jia et al., "A New Integrated Onboard Charger and Accessory Power Converter for Plug-in Electric Vehicles," ECCE 2014, Abstract only, 2 pages.

Su, Gui-Jia, et al., "An Integrated Onboard Charger and Accessory Power Converter Using WBG Devices," ECCE 2015, downloaded from www.osti.gov on Jun. 24, 2020, 8 pages.

Su, Gui-Jia et al., "An Integrated Onboard Charger and Accessory Power Converter for Traction Drive Systems with a Boost Converter," ECCE 2016, Sep. 2016, Abstract only, 2 pages.

Anwar, Usama, et al., "A High Power Density Drivetrain-Integrated Electric Vehicle Charger," ECCE 2016, Sep. 2016, Abstract only, 2 pages.

Mariethoz, Sebastien, et al., "A new hybrid isolated dc-dc converter topology for realizing very high efficiency isolated ac-dc chargers," 2017 IEEE Vehicle Power and Propulsion Conference (VPPC), Dec. 2017, Abstract only, 2 pages.

English Abstract of French Publication No. FR3018244 published Sep. 11, 2015.

English Abstract of French Publication No. FR3059276 published Jun. 1, 2018.

English Abstract of French Publication No. FR3026243 published Mar. 25, 2016.

International Preliminary Report on Patentability dated May 17, 2022, International Application No. PCT/US2019/062852.

European Office Action dated Aug. 25, 2022, European Patent Application No. 19818479.8.

\* cited by examiner ural text text-align: left;">
INTEGRATED CHARGER AND MOTOR CONTROL SYSTEM ISOLATED BY MOTOR

CROSS-REFERENCE TO RELATED APPLICATIONS

The present application is a continuation of International Application No. PCT/US2019/062852, filed on Nov. 22, 2019, which is hereby incorporated by reference in its entirety.

FIELD

The disclosure generally relates to the field of electric power circuits such as electric power circuits used in electric vehicles.

BACKGROUND

Electric power circuits include AC to DC power converters, as well as DC to DC power converters. Electric power converters have a wide range of uses including, but not limited to, use in an On-Board Charger (OBC) to charge a battery of an Electric Vehicle (EV). Electric power converters are potentially dangerous due to high voltages and currents. Isolation may reduce danger and may be required by some safety standards.

An electric motor, such as a motor of an EV, may be controlled by a Motor Control Unit (MCU). For example, an MCU may control an electric current from a battery to an electric motor of an EV.

BRIEF SUMMARY

According to one aspect of the present disclosure, there is provided an apparatus comprising a battery, a Direct Current (DC) bus connected to the battery, and a DC to DC converter connected to the battery in parallel with the DC bus. A Motor Control Unit (MCU) is connected between the DC to DC converter and an electric motor. An Alternating Current (AC) port is connected to the electric motor. A plurality of switches are provided to connect the DC bus and an output of the DC to DC converter in series as an input to the MCU in a drive mode and disconnect the DC bus from the MCU in a charge mode.

Optionally, in the preceding aspect, in drive mode the MCU receives a voltage that is the sum of a voltage on the DC bus and a configurable voltage from the DC to DC converter, the configurable voltage selected from a voltage range.

Optionally, in any of the preceding aspects, in the charge mode AC from the AC port is rectified by the electric motor and MCU to generate a first DC voltage, the first DC voltage converted to a second DC voltage by the DC to DC converter, the second DC voltage provided to charge the battery.

Optionally, in any of the preceding aspects, the DC to DC converter includes a first multi-level power converter stage connected to the battery, a second multi-level power converter stage connected to the MCU and a transformer connected to the first multi-level power converter stage and the second multi-level power converter stage.

Optionally, in any of the preceding aspects, the DC to DC converter is a resonant converter having a resonant frequency, the DC to DC converter controlled by a processor to operate in a narrow range about the resonant frequency.

Optionally, in any of the preceding aspects, the DC to DC converter includes a first transformer connected to a first arm of a bridge and a second transformer connected to a second arm of the bridge, the first arm connected in parallel with the second arm.

Optionally, in any of the preceding aspects, the DC to DC converter includes a plurality of switches to connect outputs of the first transformer and the second transformer in series in a series mode and in parallel in parallel mode.

Optionally, in any of the preceding aspects, the MCU includes a first node connected to a first winding of the electric motor, a second node connected to a second winding of the electric motor, and a third node connected to a third winding of the electric motor, each of the first, second, and third nodes connected by switches to a first terminal and a second terminal, the switches operable to invert a DC voltage received at the first and second terminals in the drive mode and to rectify an AC voltage received at the first, second, and third motor windings in the charge mode.

Optionally, in any of the preceding aspects, a voltage doubler is connected between the first terminal and the second terminal.

Optionally, in any of the preceding aspects, the voltage doubler includes series-connected diodes connected between the first terminal and the second terminal, series-connected capacitors connected in parallel with the series-connected diodes between the first terminal and the second terminal, a first node between the series-connected diodes connected to a neutral terminal of the AC port, a second node between series-connected capacitors, and a switch connected between the first node and the second node to selectively enable voltage doubling.

Optionally, in any of the preceding aspects, an additional MCU is connected in parallel with the MCU, the MCU connected to a set of windings of the electric motor, the additional MCU connected to an additional set of windings of the electric motor, a first terminal of the AC port is connected to a neutral terminal of the set of windings and a second terminal of the AC port is connected to a neutral terminal of the additional set of windings.

Optionally, in any of the preceding aspects, an additional MCU is connected in parallel with the MCU, the MCU connected to first ends of windings of the electric motor, the additional MCU connected to second ends of windings of the electric motor, a first terminal of the AC port connected to a mid-point of a first winding of the electric motor, a second terminal of the AC port connected to a mid-point of a second winding of the electric motor, and a third terminal of the AC port connected to a mid-point of a third winding of the electric motor.

According to one other aspect of the present disclosure, there is provided a method that includes receiving Alternating Current (AC), converting the AC to a first Direct Current (DC) voltage through an electric motor and Motor Control Unit (MCU), converting the first DC voltage to a second DC voltage in a DC to DC converter, and providing the second DC voltage to a battery to charge the battery. The method further includes providing a third DC voltage from the battery to the DC to DC converter, converting the third DC voltage to a fourth DC voltage in the DC to DC converter, and providing the third DC voltage from the battery in series with the fourth DC voltage from the DC to DC converter to the MCU to power the electric motor.

Optionally, in any of the preceding aspects, the method further includes, while converting the first DC voltage to the second DC voltage, controlling the DC to DC converter to maintain the second DC voltage in a battery charging range, and while converting the third DC voltage to the fourth DC voltage, controlling the DC to DC converter according to requirements of the electric motor.

Optionally, in any of the preceding aspects converting the first DC voltage to the second DC voltage and converting the third DC voltage to the fourth DC voltage include converting in a resonant converter having a resonant frequency, the method further comprising operating the resonant converter in a frequency range about the resonant frequency.

Optionally, in any of the preceding aspects, the method further includes reconfiguring between a charge mode when the AC is received and a drive mode when the electric motor is powered, using a plurality of switches, the plurality of switches connecting a DC bus between the battery and the MCU to provide the third DC voltage from the battery in series with the fourth DC voltage from the DC to DC converter in the drive mode and disconnecting the DC bus from the MCU in the charge mode.

Optionally, in any of the preceding aspects, converting the AC to the first DC voltage through the electric motor and MCU includes passing at least one component of the AC through one or more windings of the electric motor to provide isolation between an AC source and the battery.

According to still one other aspect of the present disclosure, there is provided an electric vehicle that includes a battery, an electric motor to propel the electric vehicle, a Direct Current (DC) bus connected to the battery, and a DC to DC converter connected to the battery in parallel with the DC bus. A Motor Control Unit (MCU) is connected between the DC to DC converter and the electric motor. An Alternating Current (AC) port is connected to the MCU through one or more windings of the electric motor. A plurality of switches connect the DC bus and an output of the DC to DC converter in series to provide combined voltages of the DC bus and DC to DC converter as an input to the MCU in a drive mode and disconnect the DC bus from the MCU and provide an output voltage of the MCU to the DC to DC converter in the charge mode.

Optionally, in any of the preceding aspects, a processor is configured to control switches in the DC to DC converter to regulate output of the DC to DC converter such that the combined voltages of the DC bus and the DC to DC converter match requirements of the electric motor.

Optionally, in any of the preceding aspects, the DC to DC converter includes a resonant converter that has a resonant frequency, the processor configured to control switches in the DC to DC converter in a frequency range about the resonant frequency.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

Figure 1A:
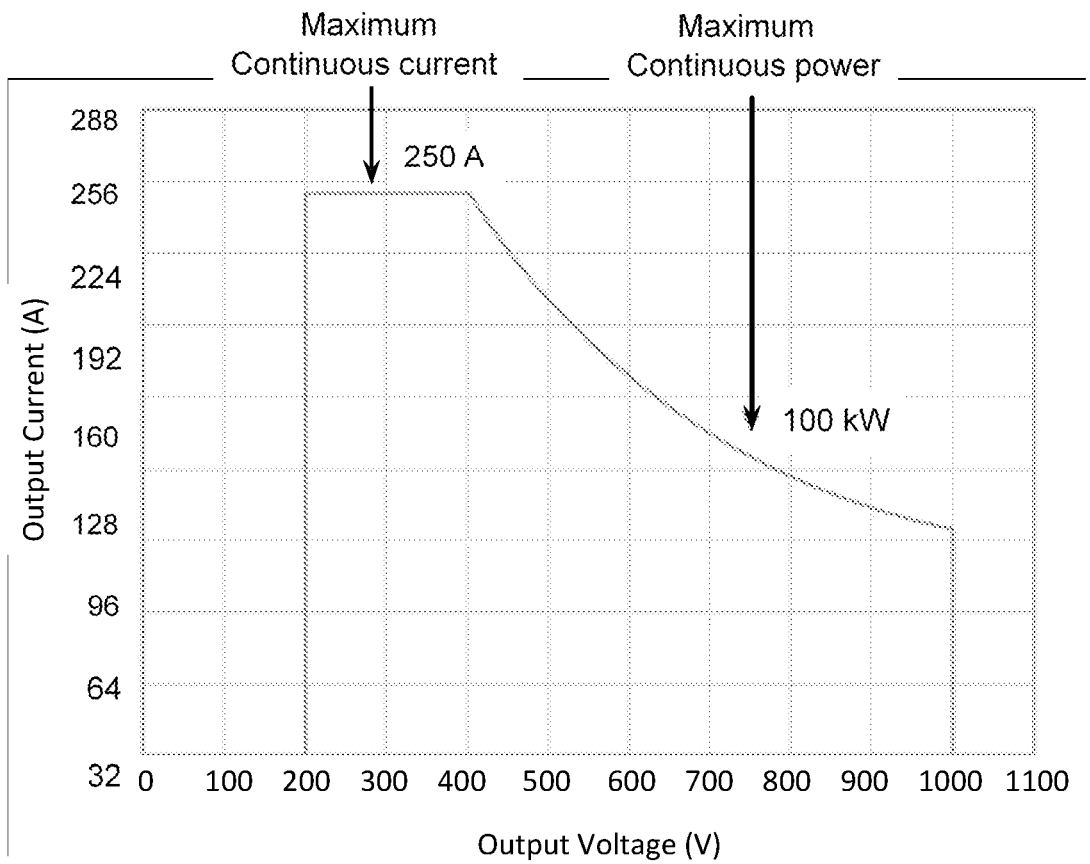
FIG. 1A illustrates output voltage and current of a charging station.

The present disclosure will now be described with reference to the Figures, which in general relate to electric power circuits that may be used, for example, in an electric vehicle. For example, circuits described here may be used for charging a battery from an external source and for controlling power to an electric motor from the battery. Using shared circuitry to perform such different functions is efficient and may save cost.

In an Electric Vehicle (EV), in charge mode (e.g. when the EV is parked and the battery is being charged), power may be received as Alternating Current (AC), for example, from a domestic outlet. AC may be connected through an electric motor in the EV where motor windings and a Motor Control Unit (MCU) may be used to rectify the AC to provide a first Direct Current (DC) voltage and to provide isolation between the AC source and EV components. A DC to DC converter may convert the first DC voltage to a second DC voltage that is provided to the battery to charge the battery. By controlling the DC to DC converter, the second voltage may be maintained at an appropriate level to efficiently charge the battery over a wide range of conditions (e.g. for a range of AC input voltages and/or different battery charge conditions).

In drive mode (e.g. when the EV is being driven and is propelled by the electric motor), a DC bus may be connected to the battery in parallel with the DC to DC converter (e.g. both receive the battery output voltage). The DC bus and an output of the DC to DC converter are connected in series to generate a combined voltage that is the sum of the DC bus voltage (e.g. third voltage directly from the battery) and the DC to DC converter output voltage (e.g. fourth voltage). The combined voltage is provided to the MCU, which uses the combined voltage to power the electric motor. The combined voltage can be controlled by controlling the DC to DC converter. This arrangement combines the efficiency of a direct battery connection provided by the DC bus with voltage control provided by the DC to DC converter.

Switches may change configuration between charge mode and drive mode. For example, switches may connect the DC bus and DC to DC converter output in series in drive mode. The switches may disconnect the DC bus and directly connect the DC to DC converter to the MCU in charge mode. Thus, while only a portion of power to the motor goes through the DC to DC converter in drive mode (with the rest going directly through the DC bus) all of the power to the battery may go through the DC to DC converter in charge mode (this is generally lower power than used in drive mode). This facilitates high power to the motor without requiring a DC to DC converter sized to handle such high power. Switches used for mode configuration may be controlled by a processor, which may also control components such as the DC to DC converter, the MCU, and/or other components. The processor may receive inputs relating to battery condition, motor conditions and requirements, and AC power.

The DC to DC converter may include multi-level power converter stages that are configurable to provide two or more different output voltages from a given input voltage. Using such multi-level power converter stages provides flexibility in power conversion, for example, allowing compatibility with external power sources that deliver power at a range of different voltages (e.g. an electric vehicle may be able to adapt to different charging stations that output different voltages and/or domestic power outlets in different countries) and allowing operation over a range of different battery conditions.

It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

The Electric Vehicle (EV) and Hybrid EV (EV/HEV) market is a fast-growing segment and demands a wide deployment of fast chargers with many challenges, where state-of-the-art charger design may typically involve the following examples of common practices and associated drawbacks:

1. Universal EV voltage compatibility with isolation: As shown in FIG. 1A, EV fast chargers need to be capable of charging EV batteries using a very wide DC voltage range, e.g., 200V-1000V DC as shown (output voltage (V) along x-axis with output current (A) on y-axis). A charger station owner may require that the same charger can operate with a wide variety of customer EV/HEV's for capital investment reasons. However, designing power supply output voltage range (e.g., 1:4 or 1:5 ratio) is quite challenging.
2. Full power capability at low output voltage level: When charging at low battery voltage, a charger needs to deliver the same power capability in order to reduce vehicle charging time. Fast charger power rating may be up to 100 kW, or greater in some cases. However, typical charger converter power capability may drop at lower output voltage due to components' current ratings. Otherwise, significant component margins may be required, thus incurring much more cost and larger packaging size.
3. High efficiency under low load power condition: When battery charging cycle is at a late stage and charging current diminishes accordingly, an EV charger may operate at a low load power level. However, typical AC-DC power converter efficiency drops significantly at low load power. Therefore, improved charger operating efficiency (e.g., >96% or above) is generally desired for station operating economics.
4. Modular design and scale of economy: From cost point of view, it is desirable that high-power fast chargers are built in modular designs as building blocks, so it can be easy to configure multiple modules in parallel and scale up the power ratings. This also requires that a charger module can handle different AC input voltage levels to address the global market. However, this is very challenging and major vendors have to offer different module designs for different parts of the world. And this implies a cost penalty.
5. High reliability and low maintenance: Commercial charger units may require less repair or replacement of key components, such as cooling fans, mechanical contactors or relays, etc. Solid-state switching components are usually more dependable with longer service lifetime. Some chargers on the market have to use DC contactors to switch modules between series and parallel operation. While this solution is effective to achieve universal charging voltage range, DC contactors are bulky and costly with limited operating lifetime. Technology improvement may provide a better choice than DC contactors.

Figure 1B:
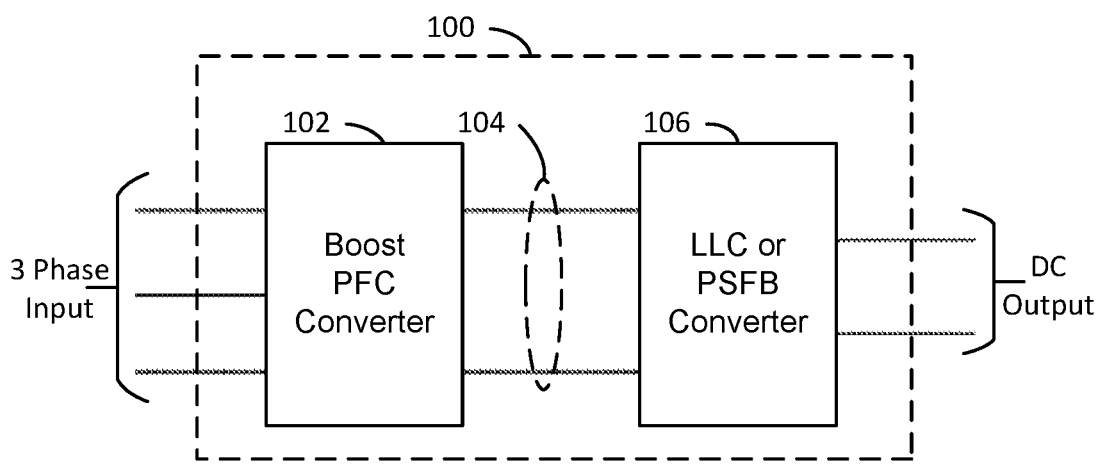
FIG. 1B illustrates an example of a two-stage fast charger.

FIG. 1B shows an example of a 2-stage fast charger 100, where a Boost Power Factor Correction (PFC) converter 102 receives power (as a 3-phase AC input in this example), regulates a variable voltage across a DC bus 104 that feeds power to a High Frequency (HF) isolated LLC converter 106 (or PSFB converter), which provides a DC output. In general, LLC converter modulation can only deliver a small range of output voltage and load power level efficiently; otherwise, its efficiency would deteriorate significantly (e.g. outside limited ranges, efficiency may drop significantly). Therefore, in this arrangement, it may be important to control DC bus voltage up and down to a desired operating setpoint in order to help LLC converter 106 to deliver better efficiency across the wide range of output voltage and load power levels.

An active PFC converter may have a peak efficiency (e.g. around 98% or lower), which may cause a major loss in total charger efficiency. Furthermore, even with PFC actively controlling a bus voltage setpoint, LLC converter 106 still may not be able to provide wide enough regulation range for EV load applications due to the efficiency drop issue. In addition, a full-power rated Pulse Width Modulation (PWM) switching Boost PFC incurs major cost because of items such as fast-switching MOSFET/IGBT and magnetic components.

In view of the limitations of the arrangement of FIG. 1B, technology improvement is desirable to provide a range of benefits in areas including specification range, efficiency performance, and cost savings.

Generally, EVs should be able to charge their batteries from at least two different power sources, e.g., DC power from a charging station, and AC power from the utility AC grid. Therefore, EV on-board power systems may include both DC and AC charging circuits, in addition to an MCU circuit that operates the EV motor during drive mode (or "traction mode").

EV power systems are sensitive to component dimension, weight, and converter efficiency. Power switching devices, such as Gallium Nitride (GaN) and Silicon Carbide (SiC)

devices may be used for efficiency, dimension and weight benefits. Also integrating may provide further gains in cost and dimensions.

Charging of EV batteries may include use of an On-Board Charging (OBC) circuit. Power from the battery may be used to power one or more electric motors to propel the electric vehicle under control of a Motor Control Unit (MCU) circuit. In some cases, certain components may be shared by these circuits, which may reduce cost and promote efficiency. Integration of OBC & MCU circuits using advanced high-frequency circuit topology and using common power converter stages (e.g. power bridges) between OBC & MCU may reduce the overall EV power system cost, size, and weight. These solutions may address those technology challenges with OBC & MCU integration, namely, having different power rating, isolation requirement, and wide voltage range.

Figure 2A:
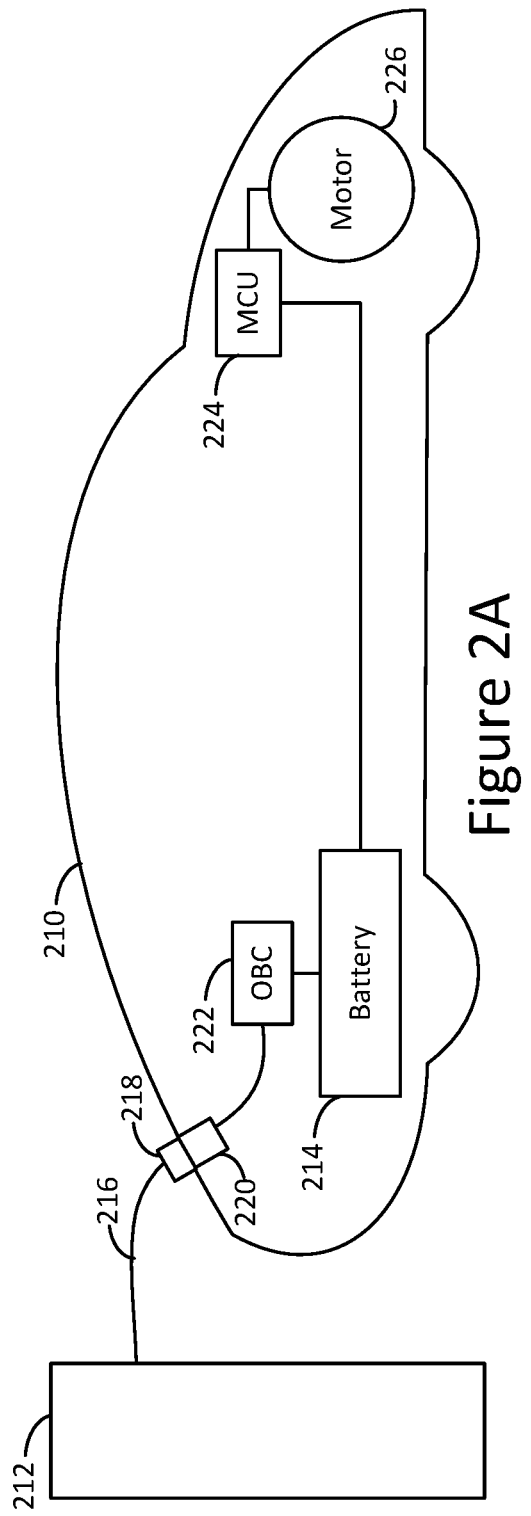
FIG. 2A is a diagram of one embodiment of an Electric Vehicle (EV).

FIG. 2A shows an example of an EV 210 connected to a charging station 212 to recharge a battery 214 of EV 210. An electric cable 216 extends from charging station 212 and ends with a connector 218 which connects with a corresponding connector 220 of EV 210. An OBC 222 is connected to connector 220 to receive power from an external source (charging station 212 in this example) and to use the power to charge battery 214 (e.g. converting AC to DC and controlling voltage and current provided to battery 214). Battery 214 is connected to provide electric power to MCU 224, which controls electrical power provided to electric motor 226 (e.g. converting DC from battery 214 to AC and controlling voltage and current provided to electric motor 226).

Figure 2B:
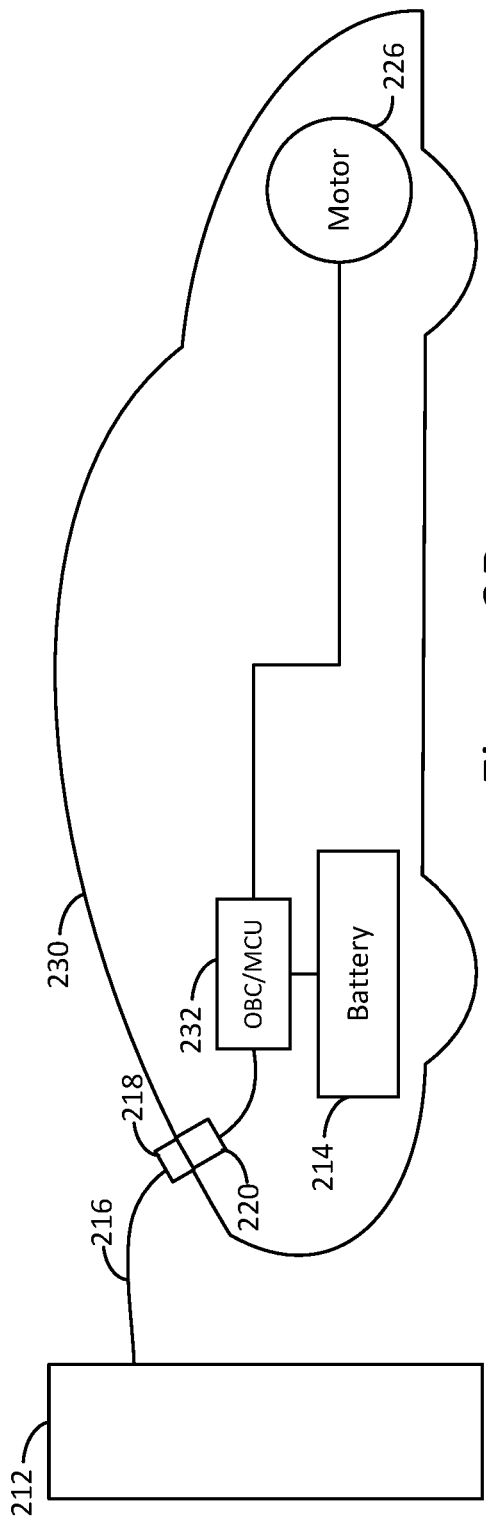
FIG. 2B is a diagram of an embodiment an EV with an OBC/MCU circuit.

FIG. 2B shows an example of another EV 230 connected to charging station 212 through electric cable 216 and connector 218, which connects to connector 220 (similar reference numbers are used for corresponding components of EVs 210, 230). An OBC/MCU circuit 232 is connected to connector 220 to receive power from an external source (charging station 212 in this example) and to use the power to charge battery 214 (e.g. converting AC to DC and controlling voltage and current provided to battery 214 similarly to OBC 222). Battery 214 is connected to provide electric power to OBC/MCU circuit 232, which controls electrical power provided to electric motor 226 (e.g. converting DC from battery 214 to AC and controlling voltage and current provided to electric motor 226 similarly to MCU 224). Thus, OBC/MCU circuit 232 of EV 230 combines functions of OBC 222 and MCU 224 of EV 210. Such a combined circuit provides some cost, weight, and space savings and may improve efficiency. Aspects of the present technology are applicable to such combined circuits (although not limited to only such circuits). While the examples of FIGS. 2A-B show charging from charging station 212, it will be understood that other power sources may be used for charging including a domestic AC supply, solar panels, or a generator (including a generator of a HEV).

Figure 2C:
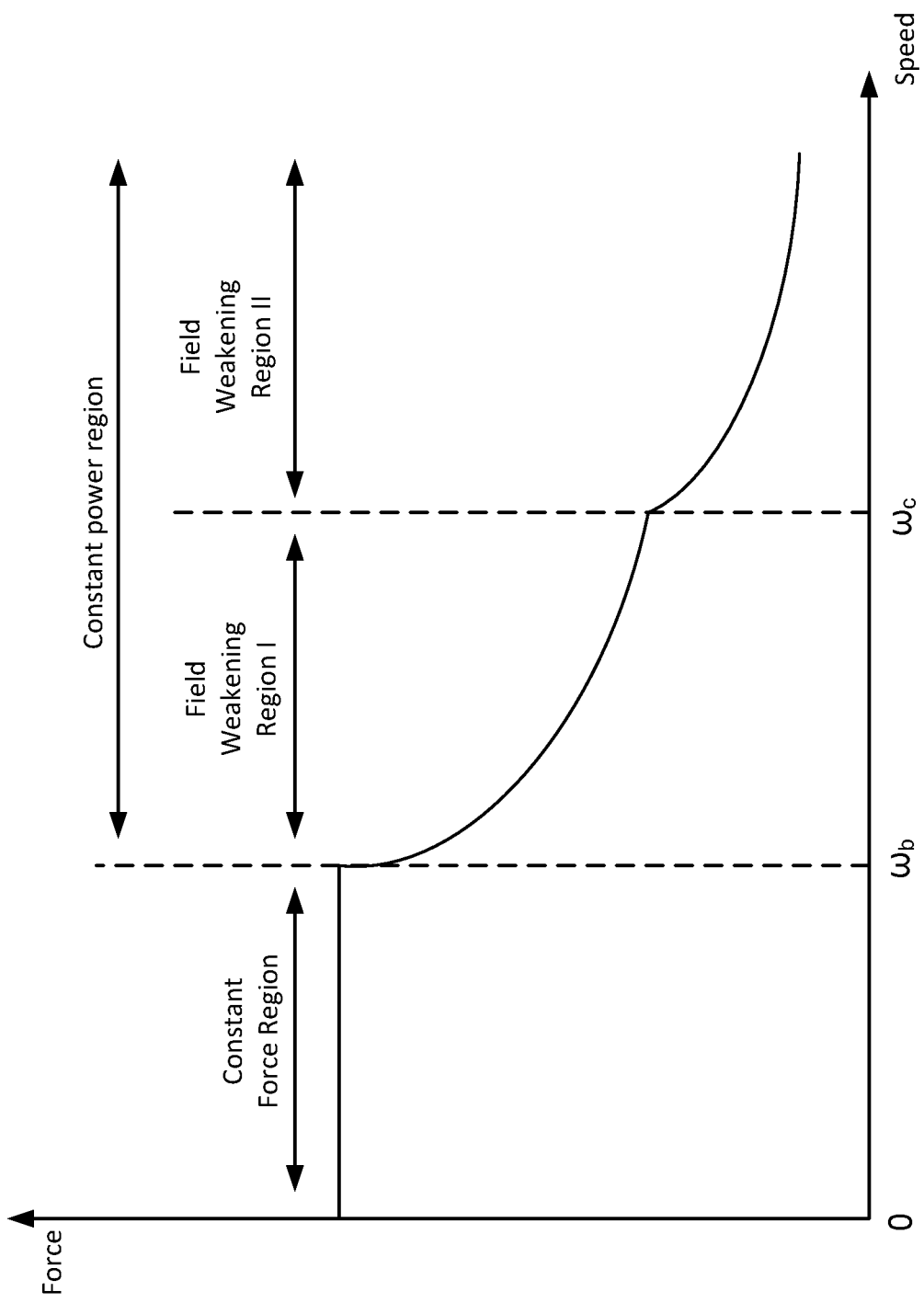
FIG. 2C illustrates operating range of an electric motor in an EV.

Operating an electric motor in an EV efficiently over its operating range can be challenging. FIG. 2C illustrates an example of a force curve for an electric motor over its full operating range (from speed=0 to a maximum speed) with speed (angular velocity) on the x-axis and force along the y-axis. The range can be divided into regions as illustrated, including a constant force region (where speed w is in the range: $0<\omega<\omega_b$) and a constant power region. The constant power region includes field weakening region I or "partial field weakening region" (where speed $\omega$ is in the range: $\omega_b<\omega<\omega_c$) and field weakening region II, or "full field weakening region" (where speed $\omega$ is in the range: $\omega_c<\omega$). Motor characteristics may be different in each region making it difficult to efficiently control a motor throughout such a range.

Figure 2D:
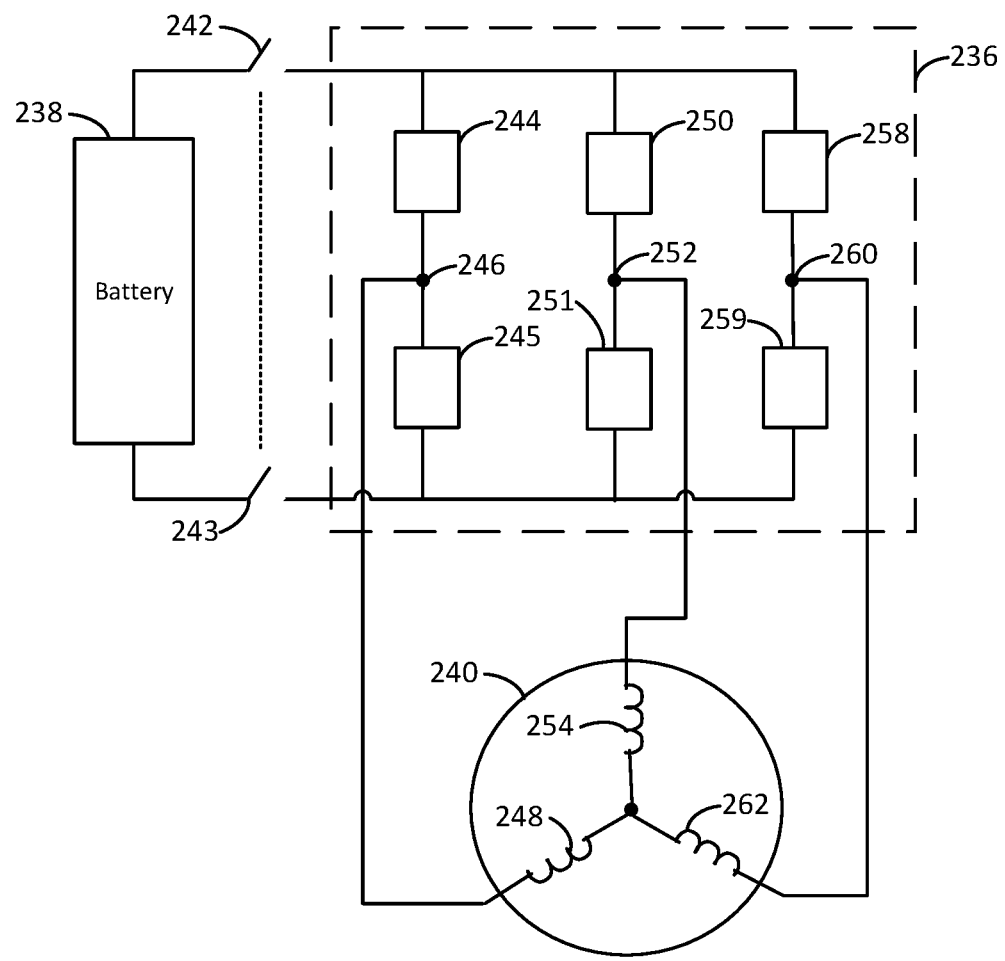
FIG. 2D illustrates an example of an MCU.

FIG. 2D shows a first example of an MCU 236 connected between a battery 238 and a motor 240 (e.g. in an EV). A pair of switches 242, 243 connect battery 238 to MCU 236. Within MCU 236, switches 244, 245 are connected in series between terminals of battery 238, with terminal 246 (or "node") between switches 244 and 245. Terminal 246 is connected to a first winding 248 of motor 240. Switches 250, 251 are connected in series between terminals of battery 238, with terminal 252 between switches 250 and 251. Terminal 252 is connected to a second winding 254 of motor 240. Switches 258, 259 are connected in series between terminals of battery 238, with terminal 260 between switches 258 and 259. Terminal 260 is connected to a third winding 262 of motor 240. Switches 244, 245, 250, 251, 258, 259 may be formed in any suitable manner, for example using a transistor with a diode connected between collector and emitter terminals. Such switches may be controlled to provide appropriate voltages to windings of motor 240 (e.g. by switching to convert a DC voltage from battery 238 into AC voltages provided to motor 240. Thus, MCU 236 functions as an inverter in this example and may also be referred to as inverter 236.

Figure 2E:
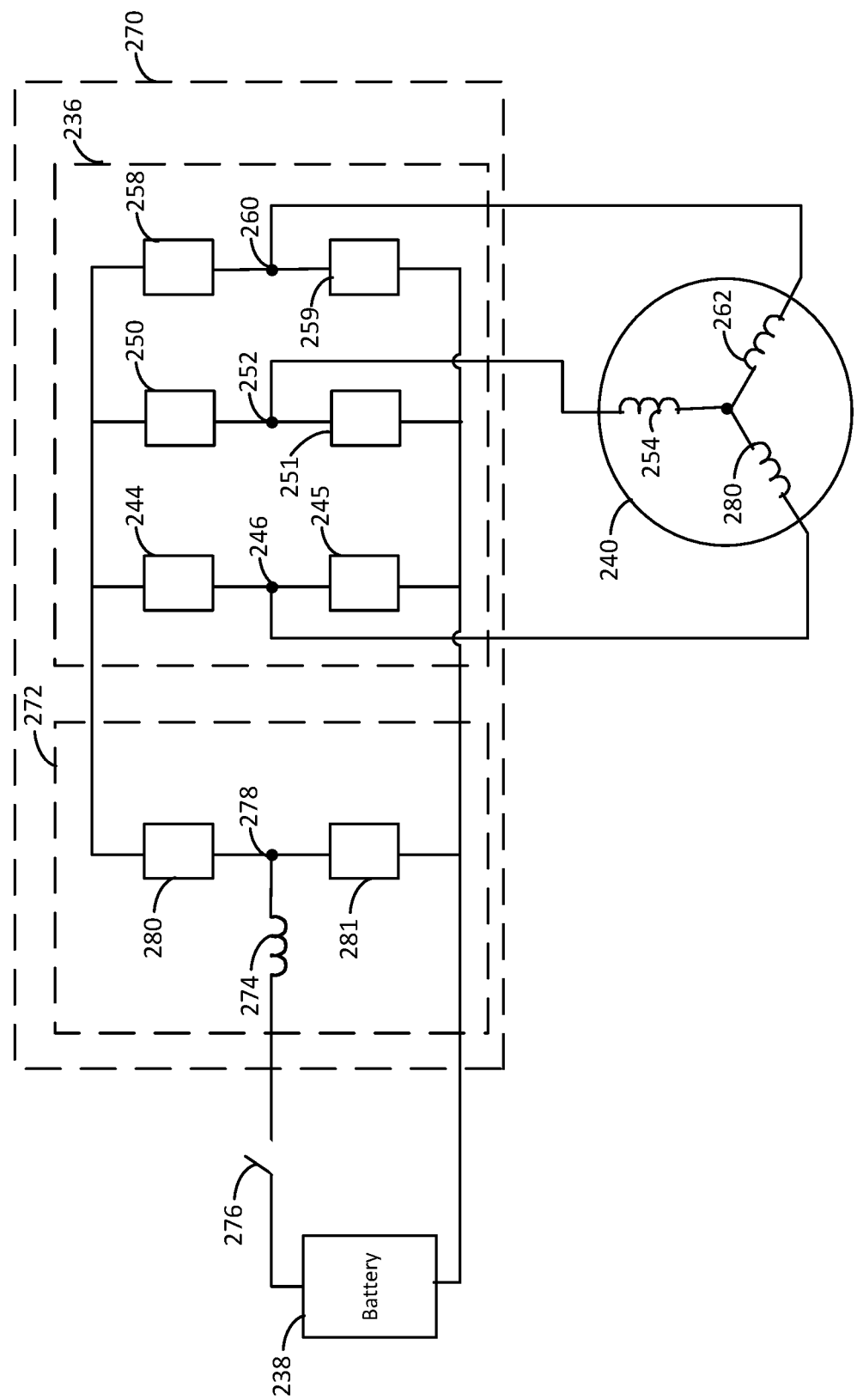
FIG. 2E illustrates another example of an MCU.

FIG. 2E shows another example of an MCU connected between battery 238 and motor 240. Similar components have similar reference numbering to FIG. 2D. In addition to inverter 236 shown in FIG. 2D, MCU 270 of FIG. 2E includes a boost converter 272 that receives a voltage from battery 238 and provides a boosted voltage to inverter 236. Boost converter 272 includes an inductor 274, which is connected to battery 238 through switch 276 at one end and is connected to node 278 at the other end. Node 278 is between switch 280 and switch 281, which are connected in series across input terminals of inverter 236 to provide a boosted output voltage to inverter 236. Switches 280, 281 and/or switches 244, 245, 250, 251, 258, 259 of inverter 236 may be formed in any suitable manner, for example using a transistor (e.g. MOSFET transistor) with a diode connected between source and drain terminals.

Figure 3A:
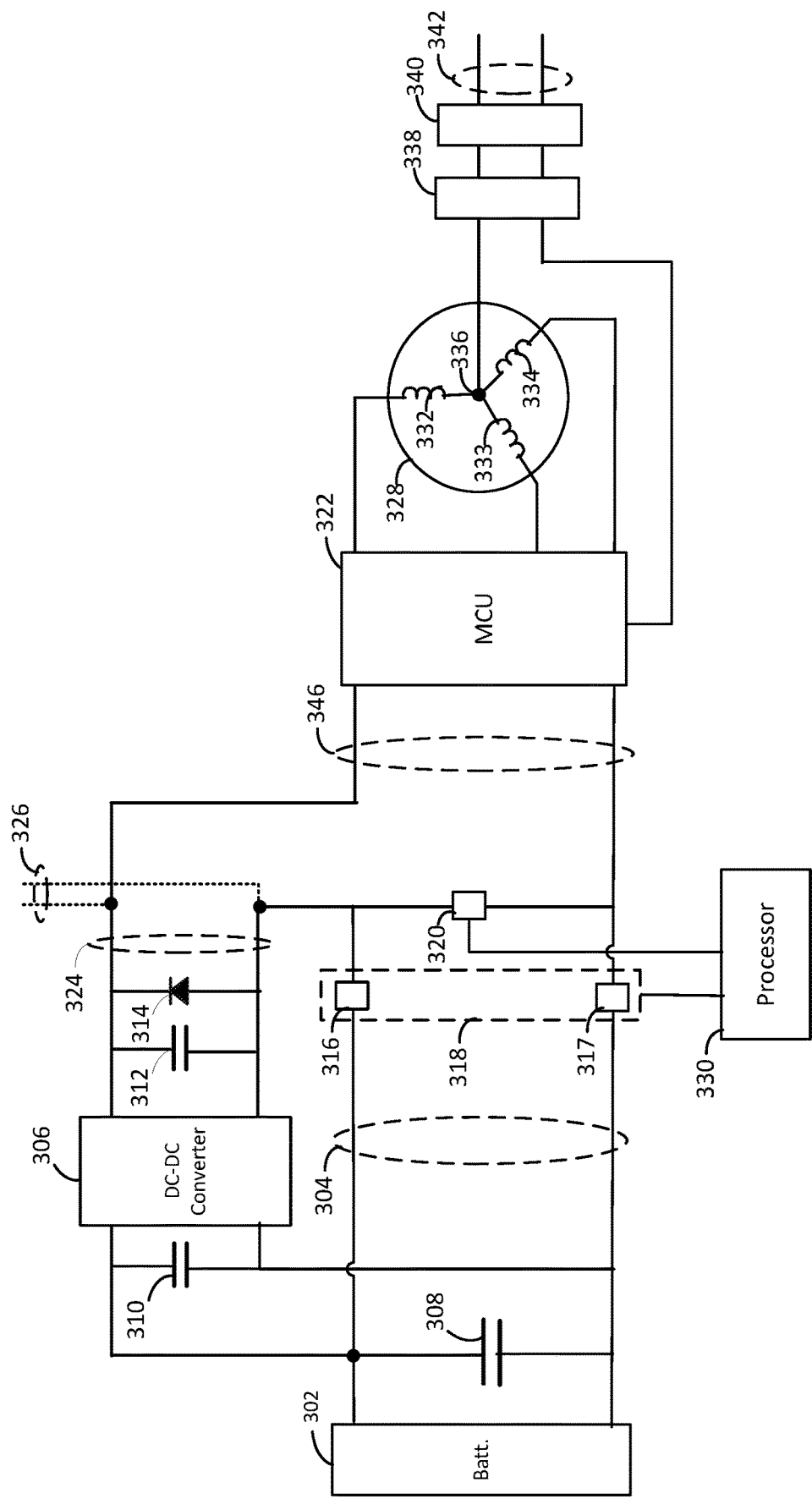
FIGS. 3A-D illustrate examples of circuits that include a DC to DC converter connected to a battery in parallel with a DC bus and their operation.

FIG. 3A shows an example of circuits that may perform functions of an OBC and MCU in an efficient manner by reconfiguring between charge mode and drive mode so that some components are used in both modes, for example, using motor windings and MCU components to rectify AC and provide isolation in charge mode and using a common DC to DC converter to provide a battery charging voltage in charge mode and to boost battery voltage supplied to the MCU in drive mode.

Battery 302 is connected to a DC bus 304 and to a DC to DC converter 306, which is connected in parallel with DC bus 304. Capacitor 308 is connected across terminals of battery 302, capacitor 310 is connected across first terminals of DC to DC converter 306, and capacitor 312 is connected across second terminals of DC to DC converter 306 to provide filtering. Diode 314 is connected in parallel with capacitor 312. Switches 316, 317, 320 are used to configure coupling of DC bus 304 and DC to DC converter 306. Switches 316 and 317 may be operated together as combined switch 318 to connect/disconnect DC bus 304. Switch 320 may connect a terminal of DC converter 306 directly to MCU 322 when DC bus 304 is disconnected and may be open when DC bus 304 is connected so that DC bus 304 (e.g. switch 320 may toggle oppositely to combined switch 318 so that one is open while the other is closed). A DC port 326 is connected to converter bus 324. DC port 326 may receive a DC voltage from an external source for charging battery 302.

MCU 322 is connected by high voltage bus 346 to DC to DC converter 306. MCU 322 is also connected to electric motor 328. The coupling of DC to DC converter 306, DC bus 304 and MCU 322 is controlled by combined switch 318, 320, which are controlled by a processor 330. Processor 330 may also control additional components, for example, processor 330 may control switching of switches in DC to DC converter 306 and/or MCU 322. Processor may receive input from one or more components (e.g. input regarding voltages at different points such as output voltage of battery 302, DC input voltage at DC port 326, AC input voltage, etc.).

MCU 322 is connected to windings 332, 333, 334 of electric motor 328. Neutral terminal 336 of electric motor 328 is connected through Electromagnetic Interference (EMI) filter 338 to AC port 340, which receives an AC input 342 from an external source. AC port 340 is also connected through EMI filter 338 to MCU 322 (e.g. neutral connection bypasses electric motor 328 and connects to MCU 322). For example, AC port 340 may include one or more connectors (like connector 220) in an EV and AC input 342 may be from a charging station, domestic AC supply, or other source.

The circuits shown in FIG. 3A may be operated in two or more modes, with at least some components used in both modes to reduce component cost and complexity, save space, and provide high efficiency. Modes may include a charge mode in which power from an external source (e.g. AC input 342) is used to charge battery 302 and a drive mode in which electric motor 328 receives power from battery 302.

Figure 3B:
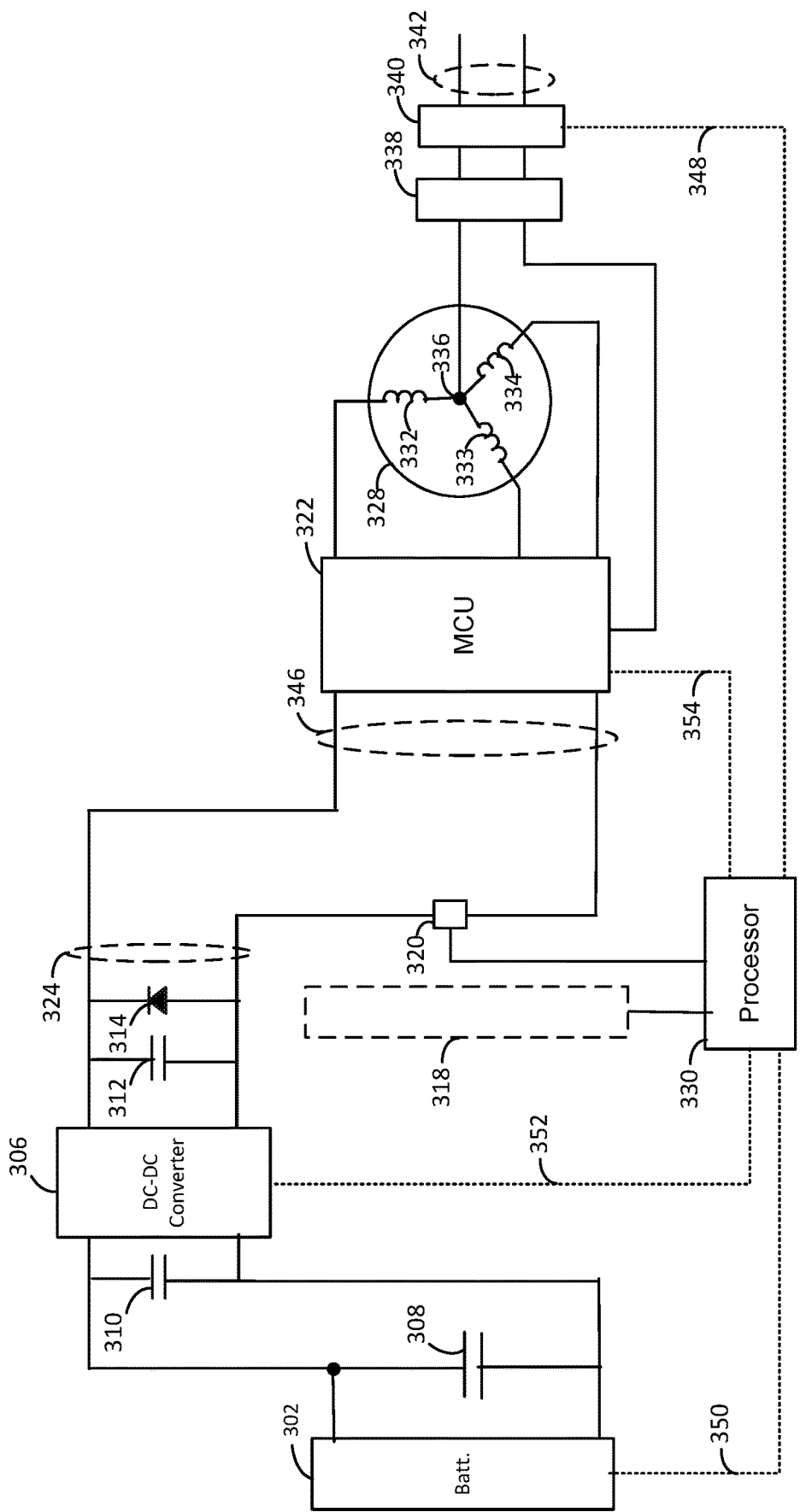

FIG. 3B shows an example of operation of circuits of FIG. 3A in charge mode with power generally flowing from right to left to charge battery 302 using AC input 342. Components that are inactive in this mode (e.g. DC bus 304 and DC port 326) are omitted for clarity. AC input 342 is provided through AC port 340 and EMI filter 338 to windings 332-334 of electric motor 328 to MCU 322. AC is rectified by windings 332-334 (which act as inductors of a rectifier circuit in this mode) and switches of MCU 322 so that a first DC voltage is provided at high voltage bus 346 and isolation is provided between high voltage bus 346 and AC input 342 (some isolation may be required under certain standards).

Combined switch 318 is open so that DC bus 304 is disconnected (and is therefore not shown in this view). Switch 320 is closed so that high voltage bus 346 is connected to converter bus 324. Thus, the first DC voltage produced by MCU 322 is provided as an input to DC to DC converter 306, which converts the first DC voltage to a second DC voltage. The second DC voltage is provided to battery 302 to charge battery 302. The second DC voltage may be a suitable voltage for charging battery 302 (e.g. may be within a battery charging range that depends on the physical structure of the battery and condition of the battery). Processor 330 may ensure that the second DC voltage remains within a battery charging range by configuring DC to DC converter 306 and/or MCU 322 appropriately according to battery 302, AC input 342, and/or other factors.

FIG. 3B shows processor 330 connected to AC port 340 through channel 348. For example, processor 330 may receive information regarding AC input 342 via channel 348 (e.g. AC voltage of AC input 342 may be obtained from one or more voltage sensors in AC port 340). Processor 330 is also connected to battery 302 through channel 350. Processor 330 may receive battery condition information via channel 350 (e.g. information regarding the charge level of battery 302). Processor 330 is also connected to DC to DC converter 306 through channel 352 and the MCU 322 through channel 354. Processor 330 may control components (e.g. switches) in DC to DC converter 306 and MCU 332 via channels 352, 354. For example, processor 330 may determine a suitable battery charging voltage from battery condition information received via channel 350 and may select a suitable configuration for DC to DC converter 306 and MCU 322 based on the battery charging voltage and AC voltage information received via channel 348. The selected configuration may be implemented by signals sent via channels 352 and 354. Configuration may be updated during a charging process as battery 302 becomes charged. Channels 348, 350, 352, and 354 may be implemented in any suitable manner, e.g. using suitable wiring and logic interface. Additional channels may connect processor 330 to additional components. For example, processor 330 may be connected to electric motor 328 and/or a user input device to receive motor information and/or user input (e.g. acceleration commands) so that voltage provided to electric motor 328 can be adjusted accordingly in drive mode.

Figure 3C:
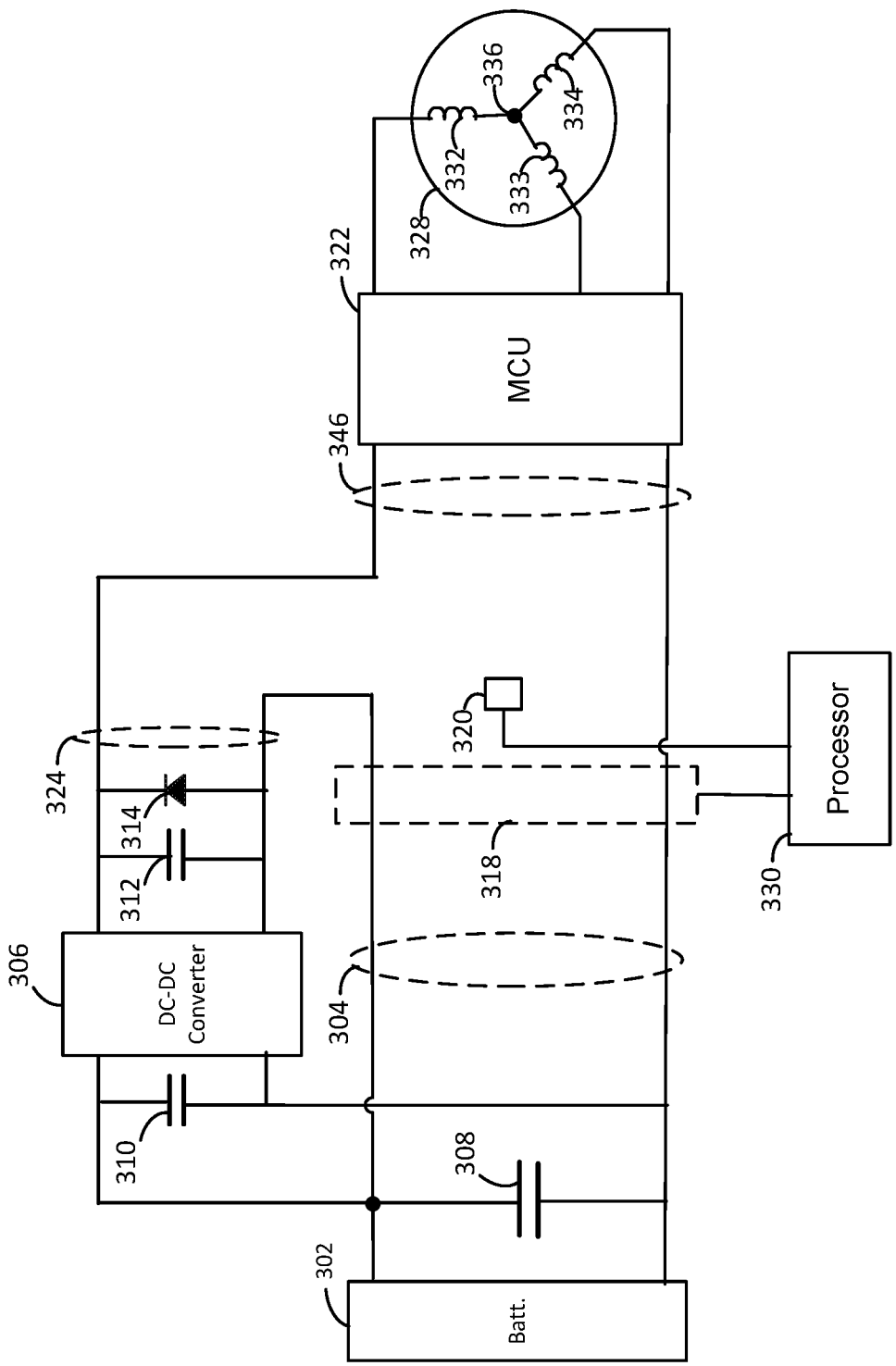

FIG. 3C shows an example of operation of circuits of FIG. 3A in drive mode with power generally flowing from left to right to power electric motor 328, which may be used to propel an EV in this mode. Components that are inactive in this mode (e.g. AC port 340, EMI filter 338, and DC port 326) are omitted for clarity. Battery 302 produces a DC battery output voltage (third DC voltage) on DC bus 304, which is connected by combined switch 318 as shown (switches 316, 317 are closed to connect DC bus 304). Because DC to DC converter 306 is connected to battery 302 in parallel with DC bus 304, DC to DC converter 306 receives the third DC voltage, which it converts to a fourth DC voltage that is provided on converter bus 324. With combined switch 318 closed and switch 320 open as shown, DC bus 304 and converter bus 324 (the output of DC to DC converter 306) are connected in series as an input to MCU 322 (i.e. connected in series to high voltage bus 346). MCU 322 may invert the received input from high voltage bus 346 and provide corresponding AC components to windings 332-334 of electric motor 328 to power electric motor 328 and thus propel an EV.

In this configuration, DC voltage supplied high voltage bus 346 has two components, a first component that is supplied directly from battery 302 along DC bus 304 (i.e. at battery voltage) and a second component that is supplied through DC to DC converter 306 and that can be controlled accordingly by controlling DC to DC converter 306. At certain times, the second component may be unnecessary and DC to DC converter 306 may be inactive (and diode 314 may provide connection between DC bus 304 and high voltage bus 346). At other times, an output voltage from DC to DC converter 306 may be used to boost the voltage supplied to high voltage bus 346 above the battery voltage. For example, when electric motor 328 requires a high voltage, the voltage on high voltage bus 346 may be increased by increasing voltage on converter bus 324 through configuration of DC to DC converter 306 (channels 352, 354 are omitted for clarity but it will be understood that such channels are used to control components). Thus, significant power may be transferred directly from battery 302 to MCU 322 (through DC bus 304) while additional power may be provided through DC to DC converter 306 in a flexible manner. This stacked arrangement takes advantage of the high efficiency of a direct connection and the flexibility of connection through a DC to DC converter. DC to DC converter 306 may be sized accordingly, e.g. sized to accommodate a fraction of the maximum power of electric motor 328 rather than to accommodate the full maximum power of electric motor 328.

It can be seen that many of the same components are used at different times in charge mode (FIG. 3B) and drive mode (FIG. 3C). Reconfiguration between modes may include switching one or more switches (e.g. switches 316, 317, 320). Reconfiguration may be triggered by detecting an input. For example, charging mode may be triggered by detection of an AC input at AC port 340 while an EV is parked. Drive mode may be triggered by user input (e.g. selecting "Drive" at a user input device).

Figure 3D:
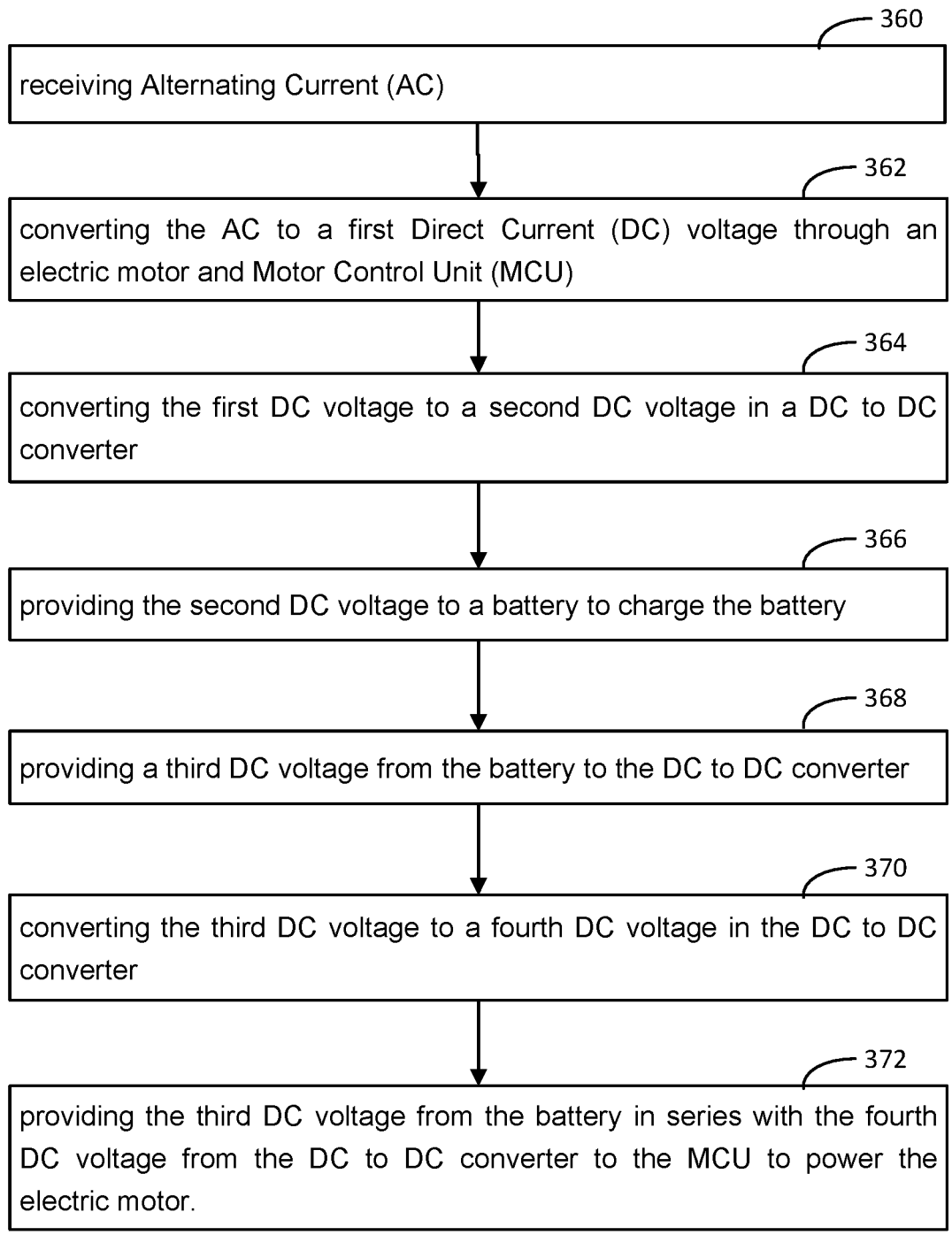

FIG. 3D illustrates an example of a method that includes both charge mode and drive mode steps. The method includes receiving Alternating Current (AC) 360, converting the AC to a first Direct Current (DC) voltage through an electric motor and Motor Control Unit (MCU) 362 (e.g. through electric motor 328 and MCU 322), converting the first DC voltage to a second DC voltage in a DC to DC converter 364 (e.g. in DC to DC converter 306), and providing the second DC voltage to a battery to charge the battery 366. These steps may be performed in a charge mode to charge a battery while connected to AC power. Subsequently, AC power may be disconnected, and configuration may be changed to drive mode in which power is delivered from the battery to the electric motor. The method includes providing a third DC voltage from the battery to the DC to DC converter 368 converting the third DC voltage to a fourth DC voltage in the DC to DC converter 370 and providing the third DC voltage from the battery in series with the fourth DC voltage from the DC to DC converter to the MCU to power the electric motor 372. For example, the third DC voltage may be provided on DC bus 304 which is connected in series with the fourth voltage from DC to DC converter 306 on converter bus 324.

Figure 4A:
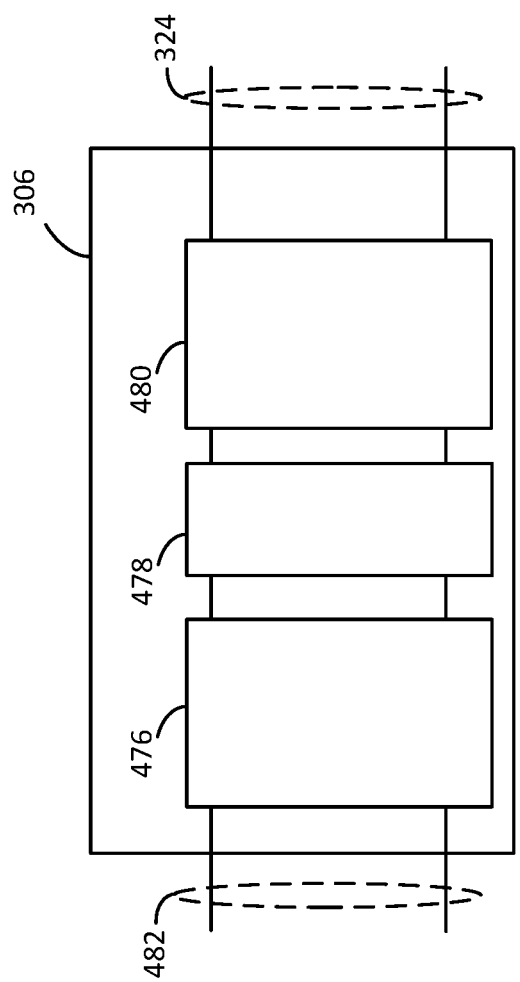
FIGS. 4A-E illustrate examples of DC to DC converter circuits.

DC to DC converter 306 may be implemented using various circuits. An example of an implementation of DC to DC converter 306 is shown in FIG. 4A. In this embodiment, DC to DC converter 306 includes a first multi-level power converter stage 476, a transformer 478, and a second multi-level power converter stage 480. Power may flow in either direction through such a DC to DC converter.

For example, in charge mode, power may flow from right to left in FIG. 4A. For example, a first DC voltage may be provided by MCU 322 on converter bus 324. Second multi-level power converter stage 480 is configured to generate an AC signal (first high frequency signal) accordingly and provide it to transformer 478. Transformer 478 generates a second high frequency signal from the first high frequency signal and provides the second high frequency signal to first multi-level power converter stage 476. The first and second high frequency signals may be at different voltages according to the winding ratio of transformer 478. First multi-level power converter stage 476 then generates a second DC voltage from the second high frequency signal and provides the second DC voltage on terminals 482, which may be connected to battery terminals of battery 302. The second DC voltage may be controlled to an appropriate voltage to efficiently charge battery 302.

In drive mode, first terminals 482 may connect to a battery (e.g. battery 302) and may be supplied with a third DC voltage from the battery (battery voltage). First multi-level power converter stage 476 is configured to generate a third high frequency signal from the third DC voltage and to provide the third high frequency signal to transformer 478, which generates a fourth high frequency signal accordingly. The third and fourth high frequency signals may be at different voltages according to the winding ratio of transformer 478. The fourth high frequency signal is provided to second multi-level power converter stage 480, which generates a fourth DC voltage on converter bus 324 from the fourth high frequency signal. The combination of multi-level power converter stages linked by a transformer (or transformers) provides a wide voltage range so that such a DC to DC converter can accommodate various power sources and can operate over various battery conditions. The components of DC to DC converter 306 may be implemented using various circuits to form multi-level power converter stages and using one or more transformer.

Figure 4B:
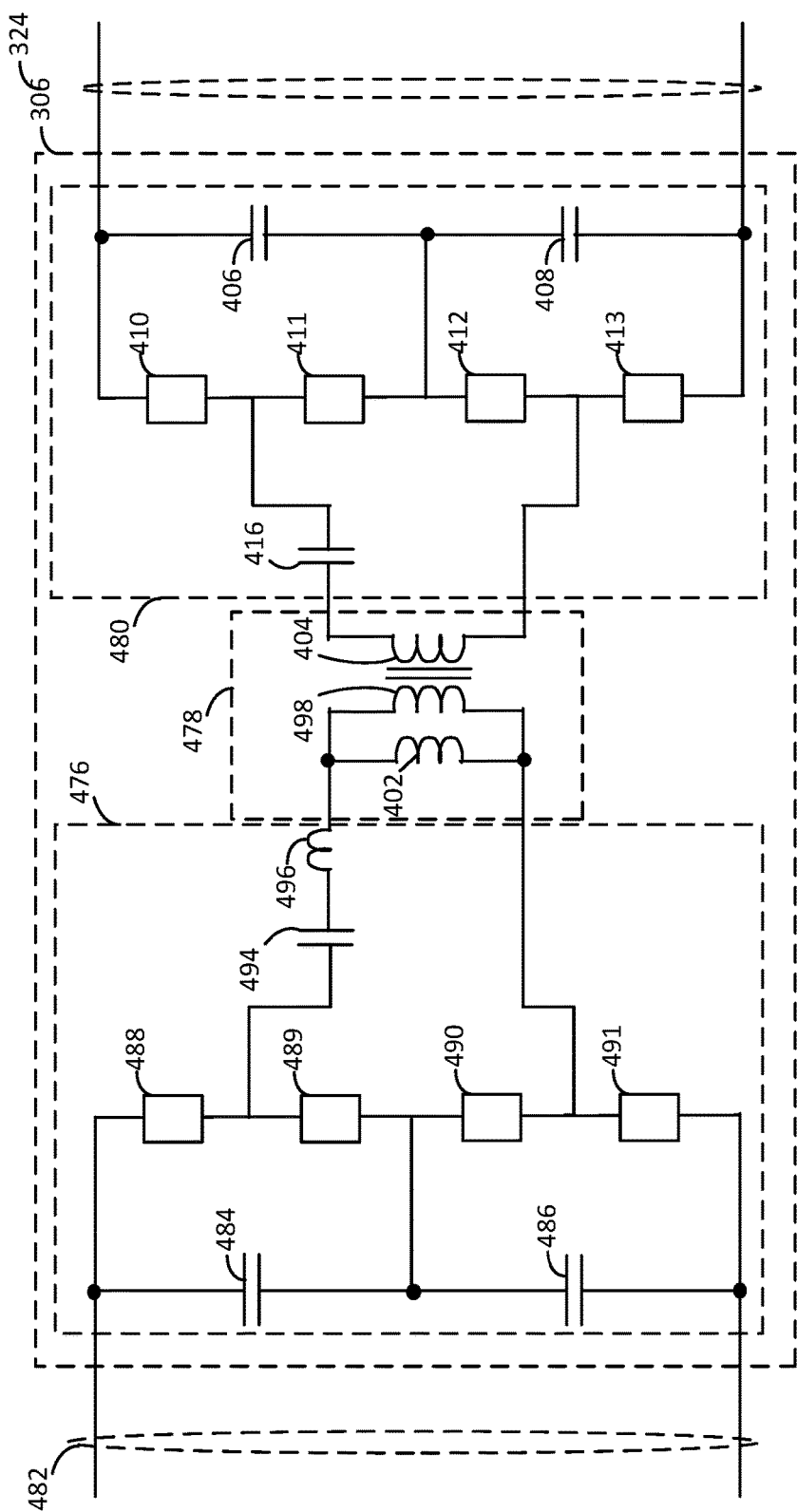

FIG. 4B shows an example implementation of DC to DC converter 306 in which first multi-level power converter stage 476 (a three-level bridge in this embodiment) includes a first capacitor 484 and a second capacitor 486 connected in series between terminals 482. Switches 488, 489, 490, 491 are also connected in series between terminals 482. Capacitors 484, 486 are connected to switches 489, 490. Switches 488 and 489 are connected through capacitor 494 (resonant capacitor) and inductor 496 (resonant inductor) to first winding 498 of transformer 478. Switches 490 and 491 are also connected to first winding 498 of transformer 478. Transformer 478 includes inductor 402 (excitation inductor) in parallel with first winding 498. Second winding 404 is coupled to first winding 498 (e.g. wound on a common core).

Inductor 496, inductor 402, and capacitor 494 represent the resonant inductance, excitation inductance and resonant capacitance in an LLC series resonant converter. In one embodiment, the LLC series resonant converter is operated near the resonant frequency, which is very efficient. In one embodiment, zero-voltage switching (ZVS) is attained by operating near the resonant frequency. ZVS is one example of a soft switching technique. Soft switching techniques may improve power efficiency by reducing switching losses.

Second multi-level power converter stage 480 (a three-level bridge in this embodiment) includes first capacitor 406 and a second capacitor 408 connected in series across converter bus 324, which may be connected to MCU 322. Switches 410, 411, 412, 413 are also connected in series across converter bus 324. Capacitors 406, 408 are connected to switches 411, 412. Switches 410, 411 are connected through capacitor 416 (resonant capacitor) to second winding 404 of transformer 478. Switches 412, 413 are also connected to second winding 404.

Figure 4C:
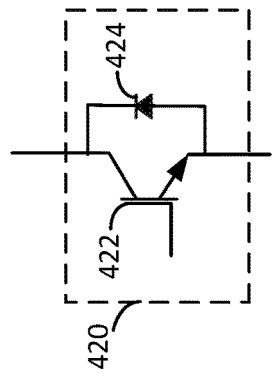

Switches 488-491 and 410-413 may be implemented by any suitable device or devices. FIG. 4C provides an example implementation of a switch 420 that may be used for switches 488-491 and 410-413. Switch 420 includes a transistor 422 with a diode 424 connected across its terminals (between collector and emitter terminals). The base terminal of transistor 422 may be used to control switch 420, e.g. may be controlled by processor 330. Thus, series connected switches 488-491 and 410-413 may include connections between a collector of a transistor of one switch and an emitter of a transistor of a neighboring switch.

Controlling switching of switches 488-491 and 410-413 provides efficient DC to DC conversion over a wide range of voltages. FIG. 4B shows DC to DC converter 306 including inductors 496, 402 and capacitor 494 forming an LLC converter, which is an example of a resonant converter that has a resonance frequency. Processor 330 may apply switching to switches 488-491 and 410-413 at a frequency that is at or near the resonance frequency so that efficiency is high. In general, multi-level power converter stages allow a wide range of voltage conversion without changing frequency so that frequency can be maintained in a range about the resonance frequency (e.g. in a narrow range where a narrow range is defined as within 1%, 3%, 5%, or 10% of the resonance frequency). For example, battery voltage may be about a third lower than nominal battery voltage when the battery is significantly discharged, e.g. in a DC voltage range of 270V-475V, or 240V-490V depending on battery condition. Voltage on converter may be in a DC voltage range of 50V-200V.

Another issue is that battery voltage and DC output voltage may have wide ranges, which may cause converter efficiency to be lower than desired (e.g. operating a resonant converter at a frequency far from its resonant frequency). Using multi-level switching bridges (e.g. 3-level switching bridges) for both high voltage and low voltage sides of a resonant converter may allow such a converter to operate efficiently over a wide range of voltage. In some cases, Silicon Carbide (SiC) devices may be used for the power converter stages (HF bridges) for higher efficiency and smaller dimension and weight.

Figure 4D:
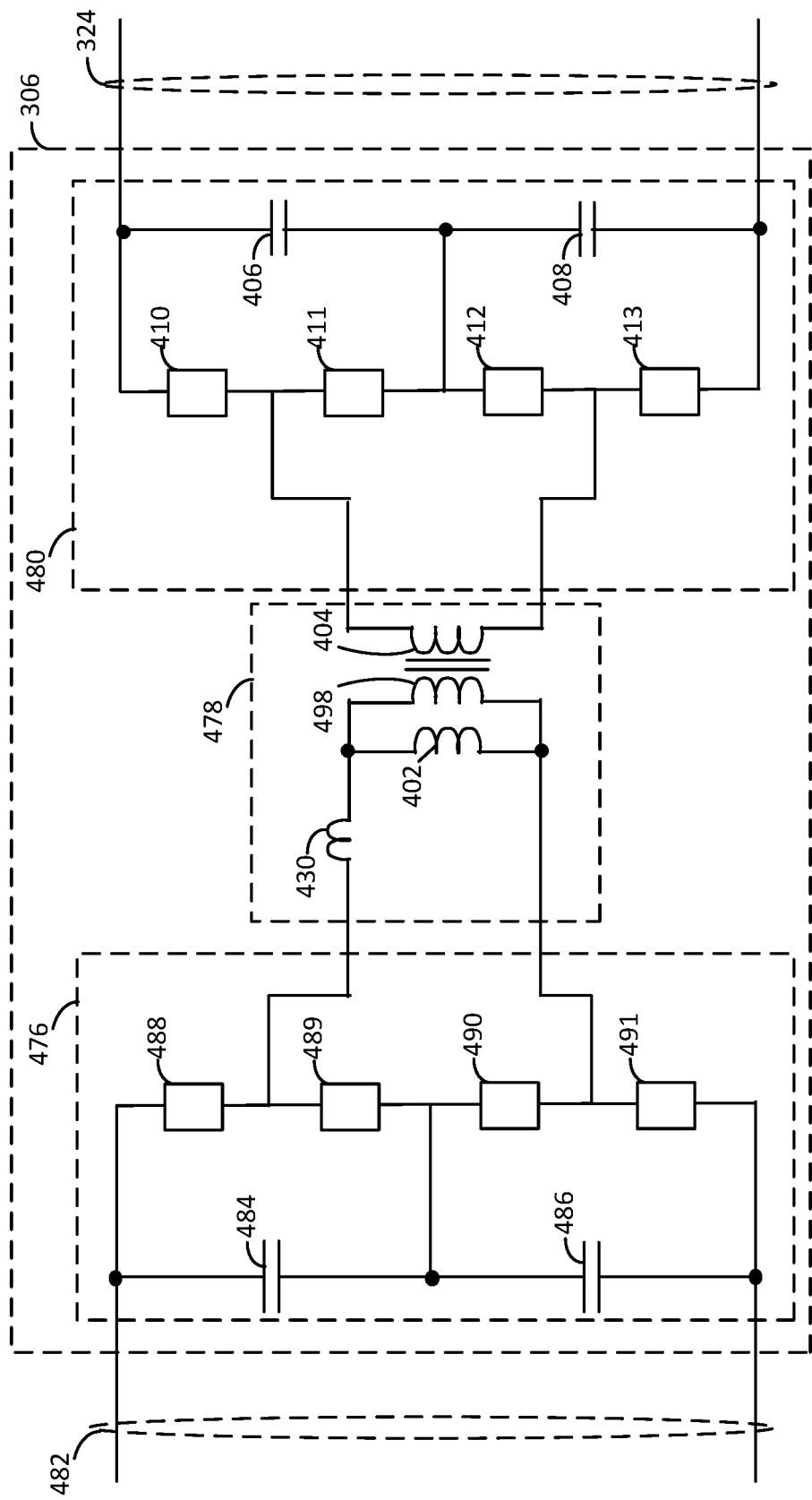

FIG. 4D shows an alternative implementation of DC to DC converter 306 using Dual Active Bridge (DAB) topology (different to the LLC topology of FIG. 4B). Components that are common to the implementation of FIG. 4B use the same numbering. First multi-level power converter stage 476 (a three-level bridge in this example) includes a first capacitor 484 and a second capacitor 486 connected in series between terminals 482. Switches 488, 489, 490, 491 are also connected in series between terminals 482. Capacitors 484, 486 are connected to switches 489, 490. Switches 488 and 489 are connected through inductor 430 to first winding 498 of transformer 478. Switches 490 and 491 are also connected to first winding 498 of transformer 478. Transformer 478 includes inductor 402 in parallel with first winding 498. Second winding 404 is coupled to first winding 498 (e.g. wound on a common core).

Second multi-level power converter stage 480 (three-level bridge) includes first capacitor 406 and a second capacitor 408 connected in series across converter bus 324, which may be connected to MCU 322. Switches 410, 411, 412, 413 are also connected in series across converter bus 324. Capacitors 406, 408 are connected to switches 411, 412. Switches 410, 411 are connected to second winding 404 of transformer 478. Switches 412, 413 are also connected to second winding 404.

Switches 488-491 and 410-413 may be implemented by any suitable device or devices, e.g. as shown in FIG. 4C. Controlling switching of switches 488-491 and 410-413 provides efficient DC to DC conversion over a wide range of voltages. FIG. 4D shows DC to DC converter 306 as a dual active bridge converter (including a first bridge in first multi-level power converter stage 476 and a second bridge in second multi-level power converter stage 480), which is an example of a resonant converter that has a resonance frequency. Processor 330 may apply switching to switches 488-491 and 410-413 at a frequency that is at or near the resonance frequency so that high efficiency is high. In general, multi-level power converter stages allow a wide range of voltage conversion without changing frequency so that frequency can be maintained in a range about the resonance frequency (e.g. in a narrow range where a narrow range is defined as within 1%, 3%, 5%, or 10% of the resonance frequency).

Figure 4E:
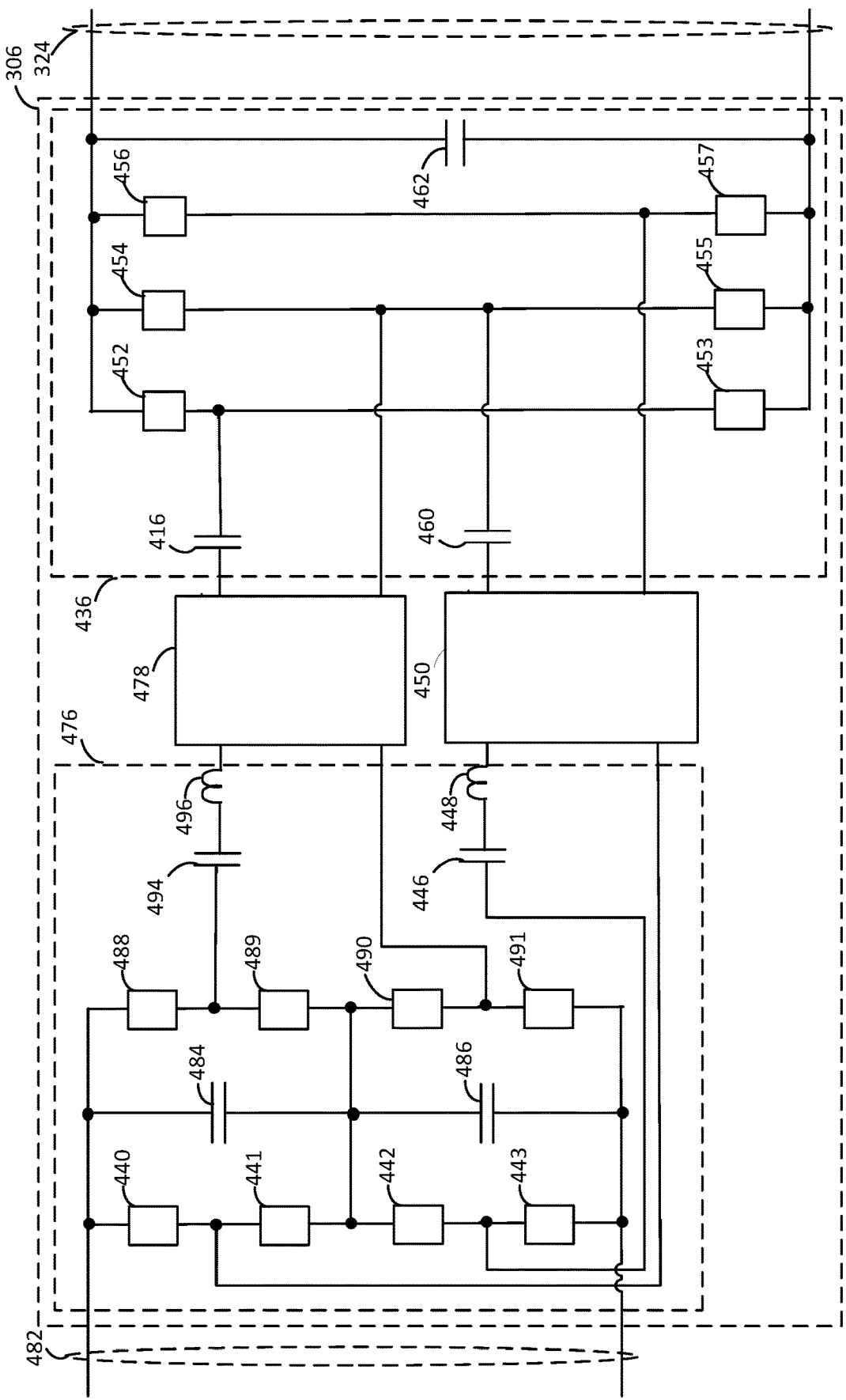

FIG. 4E shows an alternative embodiment that includes an additional transformer and additional components in first multi-level power converter stage 476 (three-level power converter stage) and with second power converter stage 436 configured for Neutral Point Clamping (NPC) Power Flow Control (PFC). DC to DC converter 306 is configured as an LLC power converter in this example (with two LLC circuits). Using two transformers in this manner facilitates design for high power (e.g. in excess of 20 kW).

First multi-level power converter stage 476 (a three-level bridge in this embodiment) includes first capacitor 484 and a second capacitor 486 connected in series between terminals 482. Switches 488, 489, 490, 491 are also connected in series to form a first arm between terminals 482 and capacitors 484, 486 are connected to switches 489, 490 as in FIG. 4B. In addition, switches 440, 441, 442, 443, are connected in series to form a second arm between terminals 482 (i.e. in parallel with switches 488-491 and with capacitors 484, 486) and are similarly connected to capacitors 484 and 486.

Switches 488 and 489 are connected through capacitor 494 and inductor 496 to transformer 478 (first transformer) and switches 490 and 491 are also connected to transformer 478 (transformer 478 is shown in more detail in FIG. 4B including connection to first multi-level power converter stage 476). Switches 442 and 443 are connected through capacitor 446 and inductor 448 to transformer 450 (second transformer, or additional transformer) and switches 444 and 441 are also connected to transformer 450. Thus, each arm of first multi-level power converter stage 476 is connected to a corresponding transformer. Transformer 478 and transformer 450 may be identical or substantially identical and coupling to components of first multi-level power converter stage 476 may be similar so that two similar LLC circuits are formed. Both LLC circuits may thus have the same resonance frequency and may operate in parallel to produce high frequency AC outputs that may be in-phase or out of phase (e.g. offset by 90 degrees, 180 degrees, or by any other offset). Terminals of transformer 478 and transformer 450 are connected to second power converter stage 436, which may connect transformers 478 and 450 in parallel or in series.

Second power converter stage 436 includes switches 452 and 453 connected in series between terminals of converter bus 324 and with a terminal of transformer 478 connected through capacitor 416 between them to allow connection to either terminal of converter bus 324. Second power converter stage 436 also includes switches 454 and 455 connected in series between terminals of converter bus 324 and with another terminal of transformer 478 connected between them to allow connection to either terminal of converter bus 324. A terminal of transformer 450 is also connected (through capacitor 460) between switches 454 and 455. Second power converter stage 436 further includes switches 456 and 457 connected in series between terminals of converter bus 324 and with a terminal of transformer 450 connected between them to allow connection to either terminal of converter bus 324. A capacitor 462 is also connected between terminals of converter bus 324. Second power converter stage 436 can connect transformers 478, 450 so that pulses are added in series or in parallel to produce different output voltages from a given input voltage.

Switches 488-491, 440-443, and 452-457 may be implemented by any suitable device or devices (e.g. as illustrated in FIG. 4C). Controlling switching of switches 488-491, 440-443, and 452-457 provides efficient DC to DC conversion over a wide range of voltages. For example, a DC voltage provided at terminals 482 may be converted into two high frequency signals by switches 488-491 and 440-443. These high frequency signals are provided (with any desired phase difference according to switching timing) to transformers 478 and 450 which generate another two high frequency signals (e.g. at different voltage). These high frequency signals may be combined by switches 452-457 to generate a DC voltage on converter bus 324 at a range of different voltage levels. High frequency signals may be connected in parallel or in series to generate a DC output at a desired voltage. Processor 330 may apply switching at a frequency that is at or near the resonance frequency of LLC circuits of DC to DC converter 306 so that high efficiency is high.

An MCU may be implemented in a number of ways. Aspects of the present technology may be implemented with a range of MCU designs including those of FIG. 2D (which includes an inverter) and FIG. 2E (which includes an inverter and boost circuit).

Figure 5:
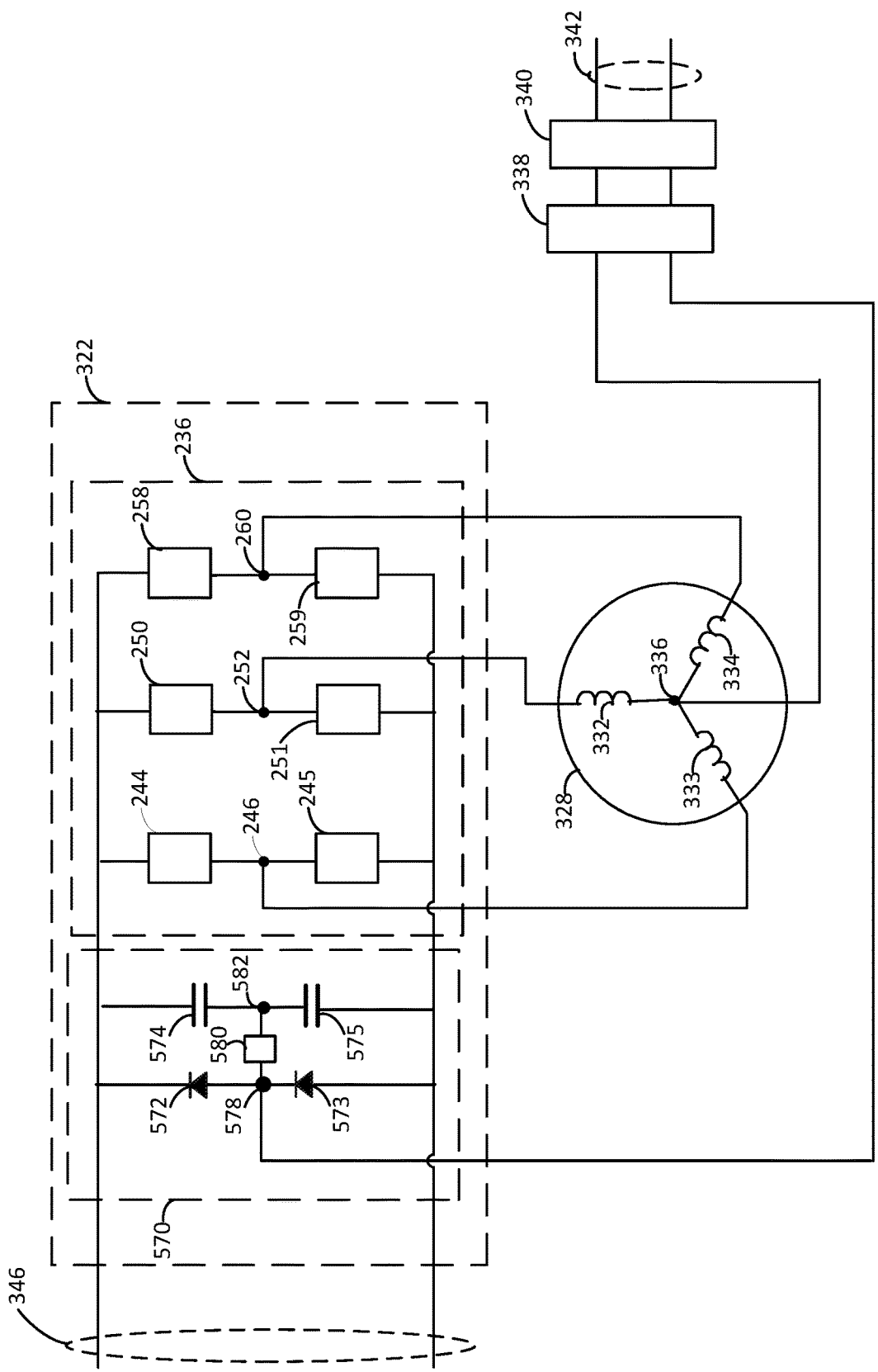
FIG. 5 illustrates an example of an MCU with a voltage doubler.

FIG. 5 illustrates an example implementation of MCU 322 connected to electric motor 328 that may be used in any of the examples described above. MCU 322 includes inverter 236 as previously illustrated in FIG. 2D and voltage doubler 570. Inverter 236 includes switches 244, 245 connected in series across high voltage bus 346 and with terminal 246 between switches 244 and 245. Terminal 246 is connected to a first winding 333 of electric motor 328. Switches 250, 251 are connected in series across high voltage bus 346, with terminal 252 between switches 250 and 251. Terminal 252 is connected to a second winding 332 of electric motor 328. Switches 258, 259 are connected in series across high voltage bus 346, with terminal 260 between switches 258 and 259. Terminal 260 is connected to a third winding 334 of electric motor 328. Switches 244, 245, 250, 251, 258, 259 may be formed in any suitable manner, for example using a transistor with a diode connected between collector and emitter terminals as shown in FIG. 4C. Such switches may be controlled to provide appropriate voltages to windings of electric motor 328 (e.g. by switching to convert a DC voltage into AC voltages provided to electric motor 328) and may also be used in combination with windings 332, 333, 334 to convert an AC voltage received at AC port 340 into a DC voltage that is output on high voltage bus 346 while providing isolation between high voltage bus 346 and AC port 340.

Voltage doubler 570 includes diodes 572 and 573 connected in series across high voltage bus 346. Capacitors 574 and 575 are also connected in series across high voltage bus 346. AC port 340 is connected (through EMI filter 338) to node 578 between diodes 572 and 573. For example, a neutral terminal of AC port 340 may be connected to node 578. A switch 580 selectively connects node 578 to node 582, which is between capacitor 574 and capacitor 575. By selectively closing switch 580 (e.g. under control of processor 330) voltage doubling by voltage doubler 570 may be enabled (i.e. when switch 580 is closed, voltage doubling is enabled and when switch 580 is open, voltage doubling is disabled). This provides additional flexibility in accommodating a wide range of voltages. For example, when a lower AC voltage (e.g. 110 volts) is received at AC port 340, voltage doubler 570 may be enabled and when a higher AC voltage (e.g. 220 volts) is received at AC port 340, voltage doubler 570 may be disabled. The effect of using voltage doubler 570 in this is to provide the same voltage on high voltage bus 346 in both cases. Voltage doubler 570 may be disabled in drive mode.

Aspects of the present technology may be applied to a wide range of electric motors in a variety of arrangements (e.g. multiple motors in an EV). A few examples are illustrated here but it will be understood that these are not limiting and that the present technology is applicable to many more types of electric motors in many more configurations.

Figure 6:
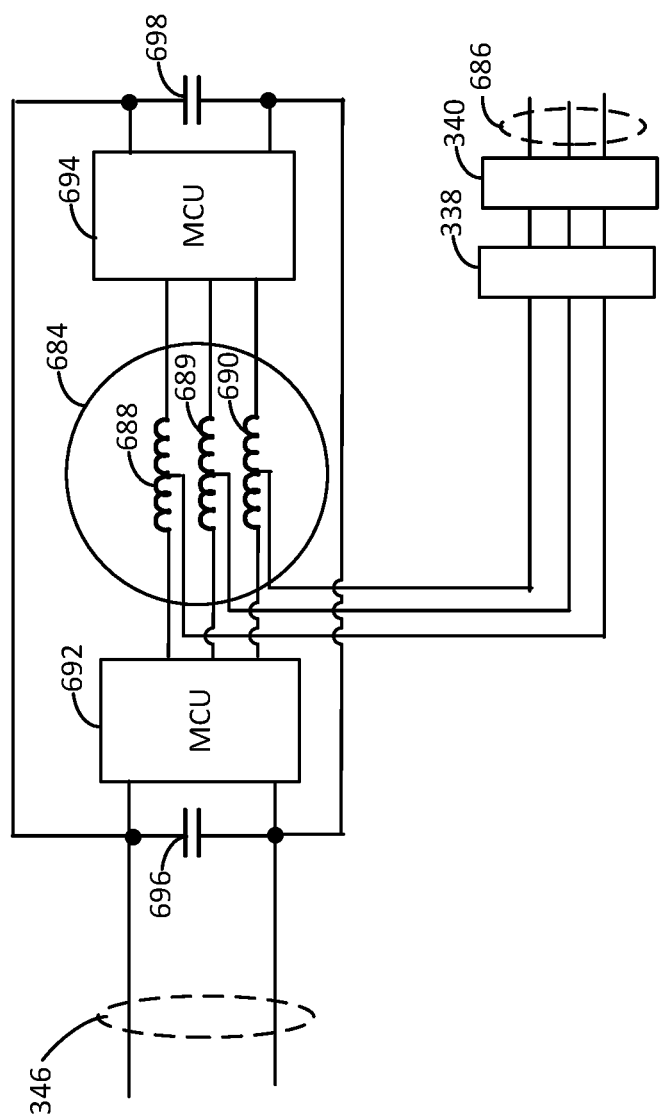
FIG. 6 illustrates an example of an open winding electric motor connected to a three-phase AC input.

FIG. 6 shows an example of an open-winding electric motor 684 connected to a three-phase AC input 686 that may be used with the present technology (e.g. replacing MCU 322 and electric motor 328 of FIG. 3A). Three-phase AC input 686, from an external source such as a charging station, passes through AC port 340 and EMI filter 338 and the three phases are connected to terminals at mid-points of windings 688, 689, 690 of electric motor 684. MCU 692 is connected to first ends of windings 688, 689, 670 (ends on the left side in FIG. 6) while MCU 694 is connected to second ends of windings 688, 689, 670 (ends on the right side in FIG. 6). MCU 692 and MCU 694 may each be similar to MCU 322 with both MCUs connected in parallel to high voltage bus 346. Capacitors 696, 698 are connected across terminals of MCU 692, 694 respectively where they connect to high voltage bus 346. In operation, three-phase AC input 686 is rectified by windings 688-690 and MCUs 692, 694 to provide a DC voltage on high voltage bus 346 and with windings 688-690 providing isolation between high voltage bus 346 and three-phase AC input 686.

Figure 7:
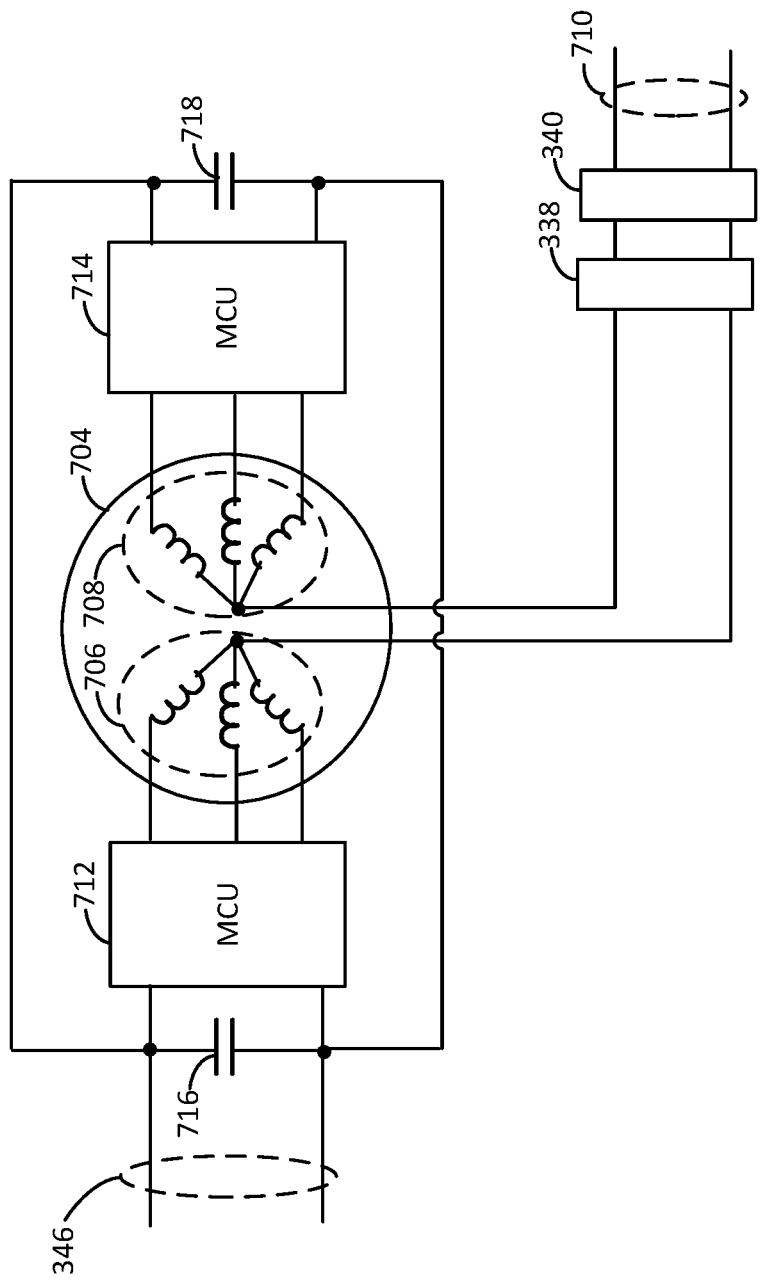
FIG. 7 illustrates an example of an electric motor with dual windings connected to a single-phase AC input.

FIG. 7 shows another example of an electric motor 704, which in this embodiment is a double-winding electric motor that includes first windings 706 and second windings 708. A single-phase AC input 710 is received by AC port 340 (e.g. from a domestic AC outlet) and is provided through EMI filter 338 to neutral nodes of first windings 706 and second windings 708. First windings 706 are connected to MCU 712 and second windings 708 are connected to MCU 714. MCU 712 is connected to high voltage bus 346, with capacitor 716 connected across its output. MCU 714 is connected to high voltage bus 346 in parallel with MCU 712 and has capacitor 718 connected across its output. In operation, single-phase AC input 710 is rectified by first windings 706, second windings 708 and MCUs 712, 714 to provide a DC voltage on high voltage bus 346 and with windings 706, 708 providing isolation between high voltage bus 346 and AC input 710.

Figure 8:
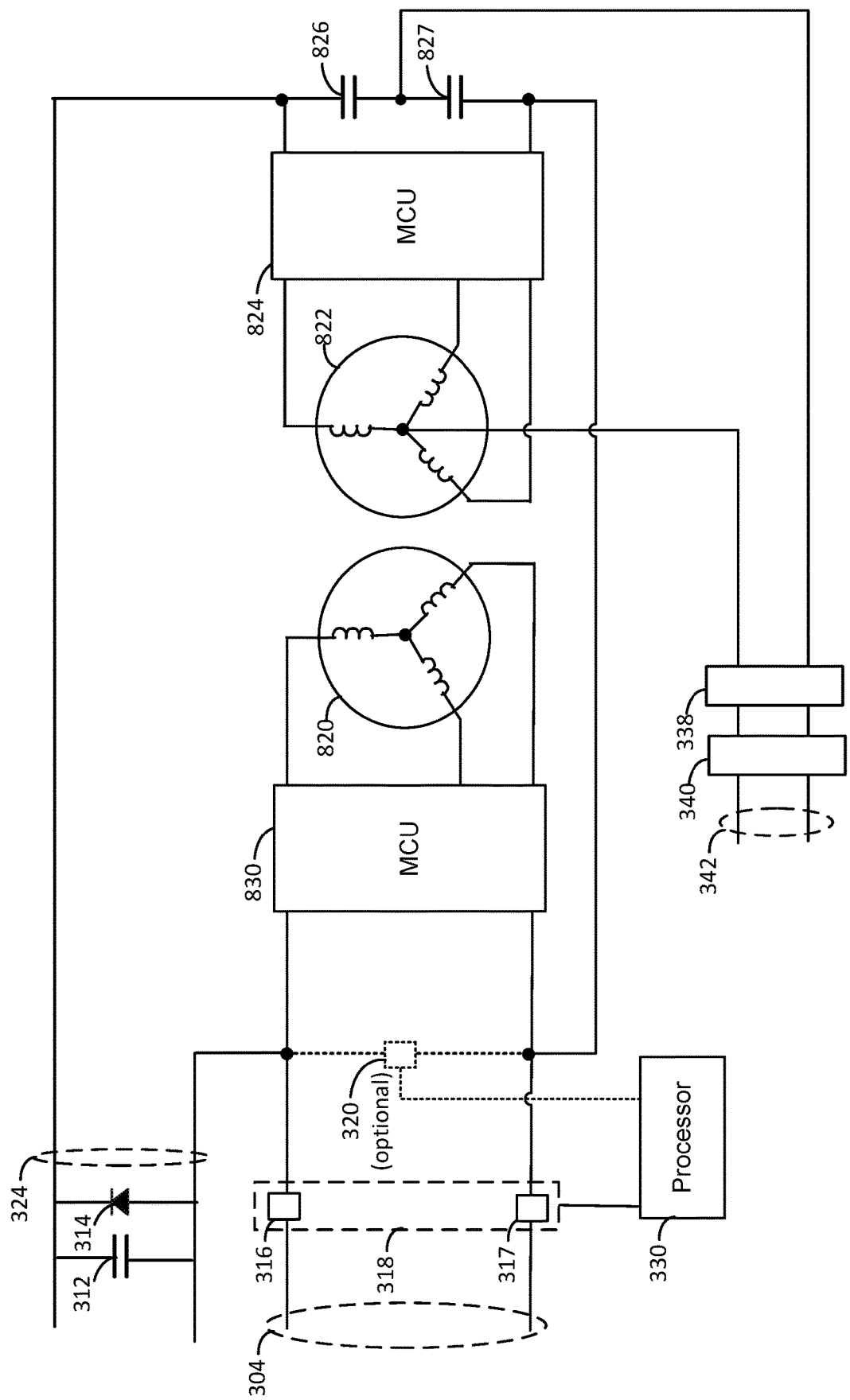
FIG. 8 illustrates an example of two electric motors with respective MCUs and different couplings to a DC bus and converter bus.

FIG. 8 shows an embodiment that includes two electric motors, electric motor 820 and electric motor 822. Electric motor 822 is connected to MCU 824, which may be connected to DC bus 304 and converter bus 324 similarly to electric motor 328 of FIG. 3A (i.e. with combined switch 318 closed and switch 320 open, DC bus 304 and converter bus 324 are connected in series so that MCU 824 receives the sum of the voltage on DC bus 304 and converter bus 324). Single-phase AC input 342 is provided through AC port 340 and EMI filter 338 to a node of electric motor 822 and to a node between capacitors 826, 827, which extend in series across terminals of MCU 824. In this configuration, AC input 342 may be rectified by electric motor 822 and MCU 824 and, with combined switch 318 open and switch 320 closed, the resulting DC voltage may be provided on converter bus 324, with windings of electric motor 822 providing isolation.

Electric motor 820 is connected to MCU 830, which is shown directly connected to DC bus 304 by combined switch 318. Thus, in drive mode, MCU 830 may receive a voltage from DC bus 304 (e.g. battery voltage), while MCU 824 may receive a voltage that is the sum of the voltage of DC bus 304 and converter bus 324. In this way, one electric motor may take advantage of the efficiency of a direct connection while the other electric motor has the flexibility provided by stacking DC bus 304 and converter bus 324 to provide a variable voltage. Electric motor 820 is not used in charge mode in this embodiment. Sufficient power for charging purposes is provided by MCU 824 (e.g. 20-40 kW). Since MCU 830 is not needed in charging mode, switch 320 may be implemented internally in MCU 830 in some cases by switches of MCU 830. Switch 320 and its connections to DC bus 304 and to processor 330 are shown by dotted lines to indicate that these components are optional. In drive mode, both MCU 830 and MCU 824 are used to provide greater power (e.g. over 120 kW, or 150 kW). Thus, while two electric motors are used, they are in different configurations and only one is used for isolation during charge mode. In other examples, more than two motors may be connected in the same or different configurations. In some cases, isolation may be provided by more than one electric motor.

Aspects of the present technology are not limited to any single type of electric motor and may be used with different electric motor designs including single winding motors, dual winding motors, and open winding motors and with any number of motors (either the same type or different types).

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. An apparatus comprising:
    a battery;
    a Direct Current (DC) bus connected to the battery;
    a DC to DC converter connected to the battery in parallel with the DC bus;
    a Motor Control Unit (MCU) connected between the DC to DC converter and an electric motor, the MCU including a first node connected to a first winding of the electric motor, a second node connected to a second winding of the electric motor, and a third node connected to a third winding of the electric motor, each of the first, second, and third nodes connected by switches to a first terminal and a second terminal, the switches operable to invert a DC voltage received at the first and second terminals in a drive mode and to rectify an AC voltage received at the first, second, and third motor windings in a charge mode, the MCU further including a voltage doubler connected between the first terminal and the second terminal, the voltage doubler including series-connected diodes connected between the first terminal and the second terminal, series-connected capacitors connected in parallel with the series-connected diodes between the first terminal and the second terminal, a first node between the series-connected diodes connected to a neutral terminal of an AC port, a second node between series-connected capacitors, and a switch connected between the first node and the second node to selectively enable voltage doubling;
    the Alternating Current (AC) port connected to windings of the electric motor to provide AC current to the windings, the windings configured to act as inductors of a rectifier circuit for AC charging; and
    a plurality of switches to connect the DC bus and an output of the DC to DC converter in series as an input to the MCU in the drive mode and disconnect the DC bus from the MCU in the charge mode.

2. The apparatus of claim 1, wherein in the drive mode the MCU receives a voltage that is the sum of a voltage on the DC bus and a configurable voltage from the DC to DC converter, the configurable voltage selected from a voltage range.

3. The apparatus of claim 1, wherein in the charge mode, AC from the AC port is rectified by the electric motor and MCU to generate a first DC voltage, the first DC voltage converted to a second DC voltage by the DC to DC converter, the second DC voltage provided to charge the battery.

4. The apparatus of claim 1, wherein the DC to DC converter includes a first multi-level power converter stage connected to the battery, a second multi-level power converter stage connected to the MCU and a transformer connected to the first multi-level power converter stage and the second multi-level power converter stage.

5. The apparatus of claim 1, wherein the DC to DC converter is a resonant converter having a resonant frequency, the DC to DC converter controlled by a processor to operate in a narrow range about the resonant frequency.

6. The apparatus of claim 1, wherein the DC to DC converter includes a first transformer connected to a first arm of a bridge and a second transformer connected to a second arm of the bridge, the first arm connected in parallel with the second arm.

7. The apparatus of claim 6, wherein the DC to DC converter includes a plurality of switches to connect outputs of the first transformer and the second transformer in series in a series mode and in parallel in parallel mode.

8. The apparatus of claim 1, further comprising an additional MCU connected in parallel with the MCU, the MCU connected to a set of windings of the electric motor, the additional MCU connected to an additional set of windings of the electric motor, a first terminal of the AC port is connected to a neutral terminal of the set of windings and a second terminal of the AC port is connected to a neutral terminal of the additional set of windings.

9. The apparatus of claim 1, further comprising an additional MCU connected in parallel with the MCU, the MCU connected to first ends of windings of the electric motor, the additional MCU connected to second ends of windings of the electric motor, a first terminal of the AC port connected to a mid-point of a first winding of the electric motor, a second terminal of the AC port connected to a mid-point of a second winding of the electric motor, and a third terminal of the AC port connected to a mid-point of a third winding of the electric motor.

10. A method comprising:
receiving Alternating Current (AC);
converting the AC to a first Direct Current (DC) voltage through an electric motor and Motor Control Unit (MCU) with windings of the electric motor forming inductors of a rectifier circuit, the MCU including a first node connected to a first winding of the electric motor, a second node connected to a second winding of the electric motor, and a third node connected to a third winding of the electric motor, each of the first, second, and third nodes connected by switches to a first terminal and a second terminal, the switches rectifying the AC received at the first, second, and third motor windings in a charge mode, the MCU further including a voltage doubler connected between the first terminal and the second terminal, the voltage doubler including series-connected diodes connected between the first terminal and the second terminal, series-connected capacitors connected in parallel with the series-connected diodes between the first terminal and the second terminal, a first node between the series-connected diodes connected to a neutral terminal of the AC port, a second node between series-connected capacitors, and a switch connected between the first node and the second node to selectively enable voltage doubling;
converting the first DC voltage to a second DC voltage in a DC to DC converter;
providing the second DC voltage to a battery to charge the battery;
providing a third DC voltage from the battery to the DC to DC converter;
converting the third DC voltage to a fourth DC voltage in the DC to DC converter;
providing the third DC voltage from the battery in series with the fourth DC voltage from the DC to DC converter to the MCU to power the electric motor; and
the switches inverting a received DC voltage that is received at the first and second terminals in a drive mode.

11. The method of claim 10 further comprising:
while converting the first DC voltage to the second DC voltage, controlling the DC to DC converter to maintain the second DC voltage in a battery charging range; and
while converting the third DC voltage to the fourth DC voltage, controlling the DC to DC converter according to requirements of the electric motor.

12. The method of claim 10 wherein converting the first DC voltage to the second DC voltage and converting the third DC voltage to the fourth DC voltage includes converting in a resonant converter having a resonant frequency, the method further comprising operating the resonant converter in a frequency range about the resonant frequency.

13. The method of claim 10 further comprising reconfiguring between the charge mode and the drive mode.

14. The method of claim 10 wherein converting the AC to the first DC voltage through the electric motor and MCU includes passing at least one component of the AC through one or more windings of the electric motor to provide isolation between an AC source and the battery.

15. An electric vehicle comprising:
a battery;
an electric motor to propel the electric vehicle;
a Direct Current (DC) bus connected to the battery;
a DC to DC converter connected to the battery in parallel with the DC bus;
a Motor Control Unit (MCU) connected between the DC to DC converter and the electric motor, the MCU including a first node connected to a first winding of the electric motor, a second node connected to a second winding of the electric motor, and a third node connected to a third winding of the electric motor, each of the first, second, and third nodes connected by switches to a first terminal and a second terminal, the switches operable to invert a DC voltage received at the first and second terminals in a drive mode and to rectify an AC voltage received at the first, second, and third motor windings in a charge mode, the MCU further including a voltage doubler connected between the first terminal and the second terminal, the voltage doubler including series-connected diodes connected between the first terminal and the second terminal, series-connected capacitors connected in parallel with the series-connected diodes between the first terminal and the second terminal, a first node between the series-connected diodes connected to a neutral terminal of an AC port, a second node between series-connected capacitors, and a switch connected between the first node and the second node to selectively enable voltage doubling;
the Alternating Current (AC) port connected to the MCU through one or more windings of the electric motor, the one or more windings configured to act as inductors of a rectifier circuit; and
a plurality of switches to connect the DC bus and an output of the DC to DC converter in series to provide combined voltages of the DC bus and DC to DC converter as an input to the MCU in the drive mode and to disconnect the DC bus from the MCU and provide an output voltage of the MCU to the DC to DC converter in the charge mode.

16. The electric vehicle of claim 15 further comprising a processor configured to control switches in the DC to DC converter to regulate output of the DC to DC converter such that the combined voltages of the DC bus and the DC to DC converter match requirements of the electric motor.

17. The electric vehicle of claim 16 wherein the DC to DC converter includes a resonant converter that has a resonant frequency, the processor configured to control switches in the DC to DC converter in a frequency range about the resonant frequency.

* * * * *